United States Patent [19]

Bliehall

[11] Patent Number: 4,600,962
[45] Date of Patent: Jul. 15, 1986

[54] APPARATUS FOR MONITORING AND PROTECTING A DEVICE AGAINST A PLURALITY OF FAULT CONDITIONS

[75] Inventor: James C. Bliehall, Santa Rosa, Calif.
[73] Assignee: Sentec Inc., Santa Rosa, Calif.
[21] Appl. No.: 463,492
[22] Filed: Feb. 3, 1983
[51] Int. Cl.[4] .............................................. H02H 3/26
[52] U.S. Cl. ...................................... 361/77; 361/85; 361/92; 361/103; 340/825.32
[58] Field of Search ................... 361/92, 90, 85, 103, 361/77, 178; 340/825.32

[56] References Cited

U.S. PATENT DOCUMENTS

| | | | |
|---|---|---|---|
| 3,191,114 | 6/1965 | Reed | 361/29 X |
| 3,535,591 | 10/1970 | Holmquest | 361/85 X |
| 3,825,768 | 7/1974 | Grygera | 361/77 X |
| 3,846,782 | 11/1974 | Brodsky | 340/825.32 X |
| 4,053,876 | 10/1977 | Taylor | 361/92 X |
| 4,180,842 | 12/1979 | Keeney | 361/85 |
| 4,315,296 | 2/1982 | Hancock | 361/103 |
| 4,323,890 | 4/1982 | Lemke | 246/5 X |
| 4,323,943 | 4/1982 | Arnold et al. | 361/114 |
| 4,360,856 | 11/1982 | Witthaus | 361/178 X |
| 4,447,846 | 5/1984 | McCleery | 361/92 X |

OTHER PUBLICATIONS

Sentinel Computer Protection Systems, 1981.

Primary Examiner—Reinhard J. Eisenzopf
Attorney, Agent, or Firm—Fliesler, Dubb, Meyer & Lovejoy

[57] ABSTRACT

A control system for protecting a computer system against external fault conditions, including, in combination, circuits for monitoring and reacting to a plurality of power supply fault conditions, circuits for monitoring and reacting to a plurality of environmental fault conditions, circuits for monitoring and reacting to unauthorized access fault conditions, and circuits for driving off the supply of 3-phase power to the computer system in response to any one or more of these fault conditions. The invention also includes the various monitoring and reacting circuits in specific subcombinations.

21 Claims, 8 Drawing Figures

FIG_2

FIG_4

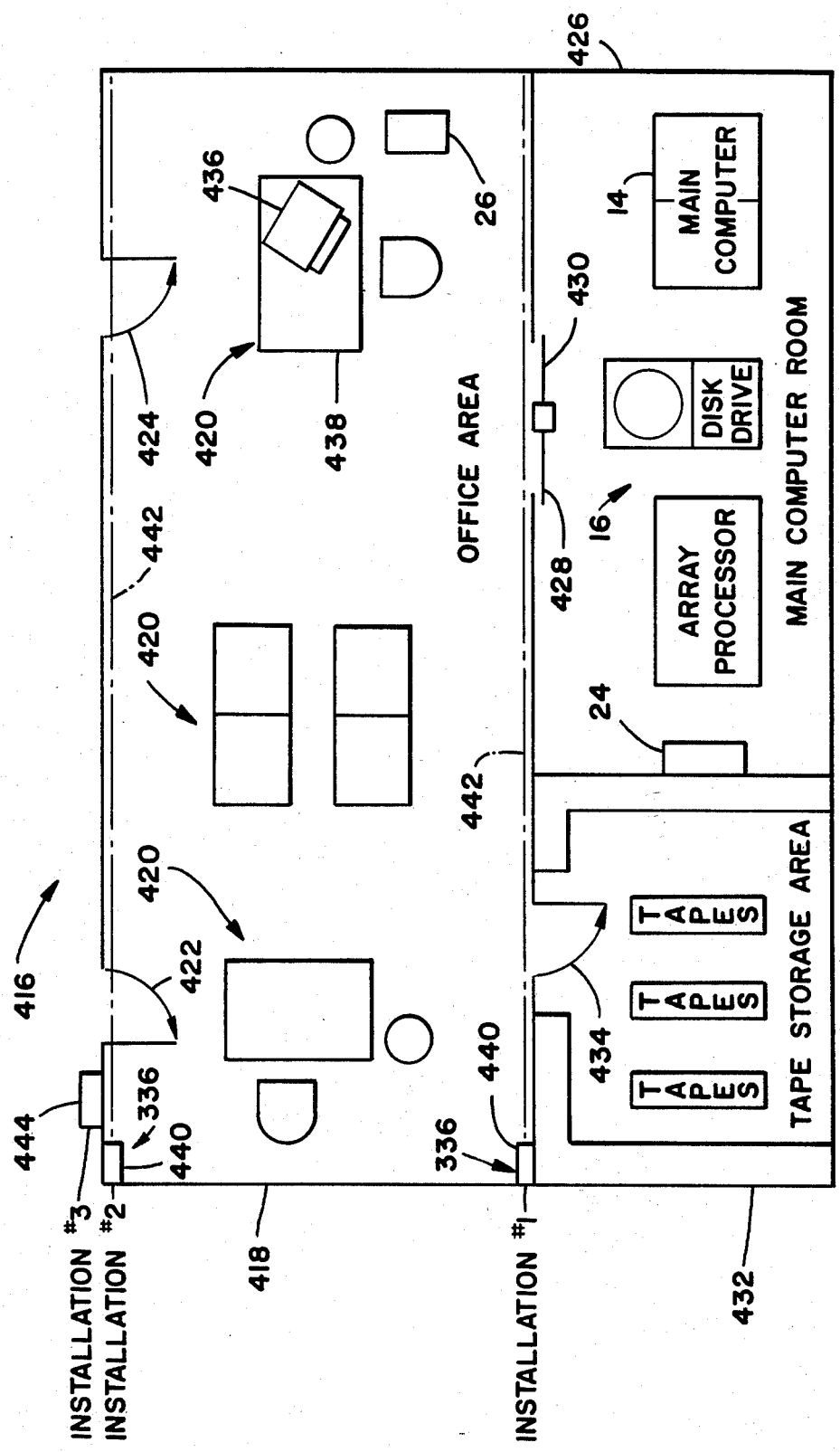
FIG_7

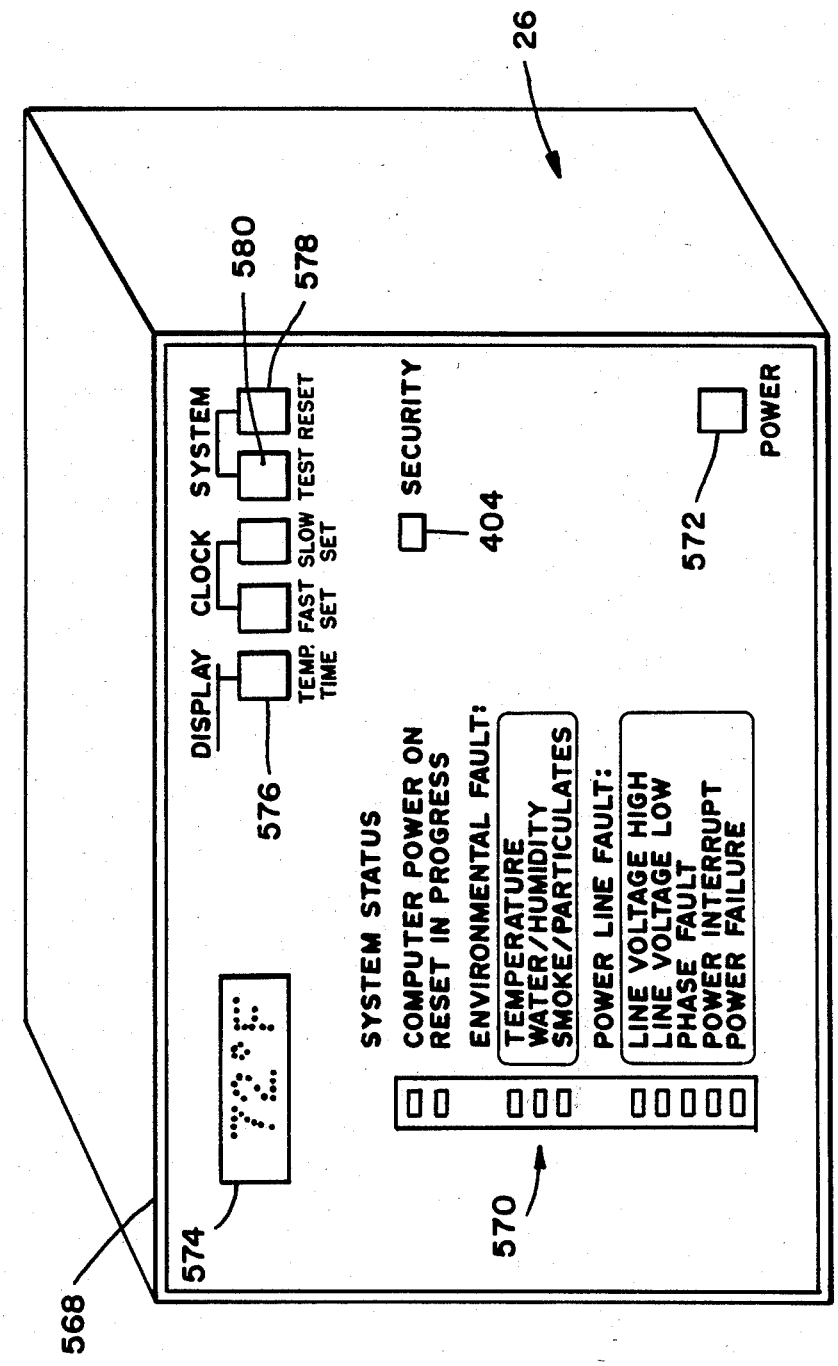
FIG_8

APPARATUS FOR MONITORING AND PROTECTING A DEVICE AGAINST A PLURALITY OF FAULT CONDITIONS

TECHNICAL FIELD

The present invention relates generally to apparatus for protecting a device against a plurality of fault conditions and, more particuarly, to a system for monitoring and reacting to external fault conditions generated in the power supply for, and environment of, a computer system, as well as unauthorized access to the computer system, to protect the computer system.

BACKGROUND ART

Devices such as computers, along with overall computer systems, will occasionally fail, be damaged or be shut down due to internal fault conditions such as a failure of the system clock. However, a substantial percentage of computer failures, damage and downtime is due to fault conditions occurring externally of the computer. These latter fault conditions can be generated in the power supply for, and environment of, the computer. Typical external power supply fault conditions that can cause a computer failure or damage or downtime are out-of-sequence phases of a three-phase power supply, loss of a phase, line voltage high (overvoltage) or line voltage low (undervoltage), power line transients, and rapid successive interruptions of the power supply. Examples of external environmental fault conditions are overtemperature, excessive water accumulation on the computer floor and excessive smoke/particulates accumulation in the computer room air. Another important consideration in the protection problem is unauthorized access to the computer, which can result in the misuse or theft of data or damage to the computer by an unskilled operator.

The problem of protecting the computer against external fault conditions has become more acute with the development of more sophisticated computers which are designed and built to operate in specific optimum conditions. The same technology that has made minicomputers and microcomputers possible, has increased their sensitivity to even the smallest external disturbances. At the same time, electric power generation and other external support systems have become increasingly overburdened and unreliable. This protection problem for the computer user is further exacerbated by the fact that the computer manufacturers will not warrant against damage caused by poor power conditions or extremes in the environment or computer misuse.

SUMMARY OF THE INVENTION

The invention includes a system for protecting a device, such as a computer, against external fault conditions, comprising, in combination, means for monitoring and reacting to a plurality of power supply fault conditions, means for monitoring and reacting to a plurality of environmental fault conditions, means for monitoring and reacting to unauthorized access conditions, and means for driving off the device in response to the occurrence of any one or more of these conditions to protect the device.

This invention also comprises the above various monitoring and reacting means in specific subcombinations, and other features such as alternate real time-temperature display means and means to halt the real time display at the time of the occurrence of a failure condition.

BRIEF DESCRIPTION OF THE DRAWINGS

FIG. 7 is a diagram of a computer room used to explain various installations of the present invention to protect against unauthorized computer access.

FIG. 8 is a front view of a control panel of the present invention.

BEST MODE OF CARRYING OUT THE INVENTION

Figure 1:
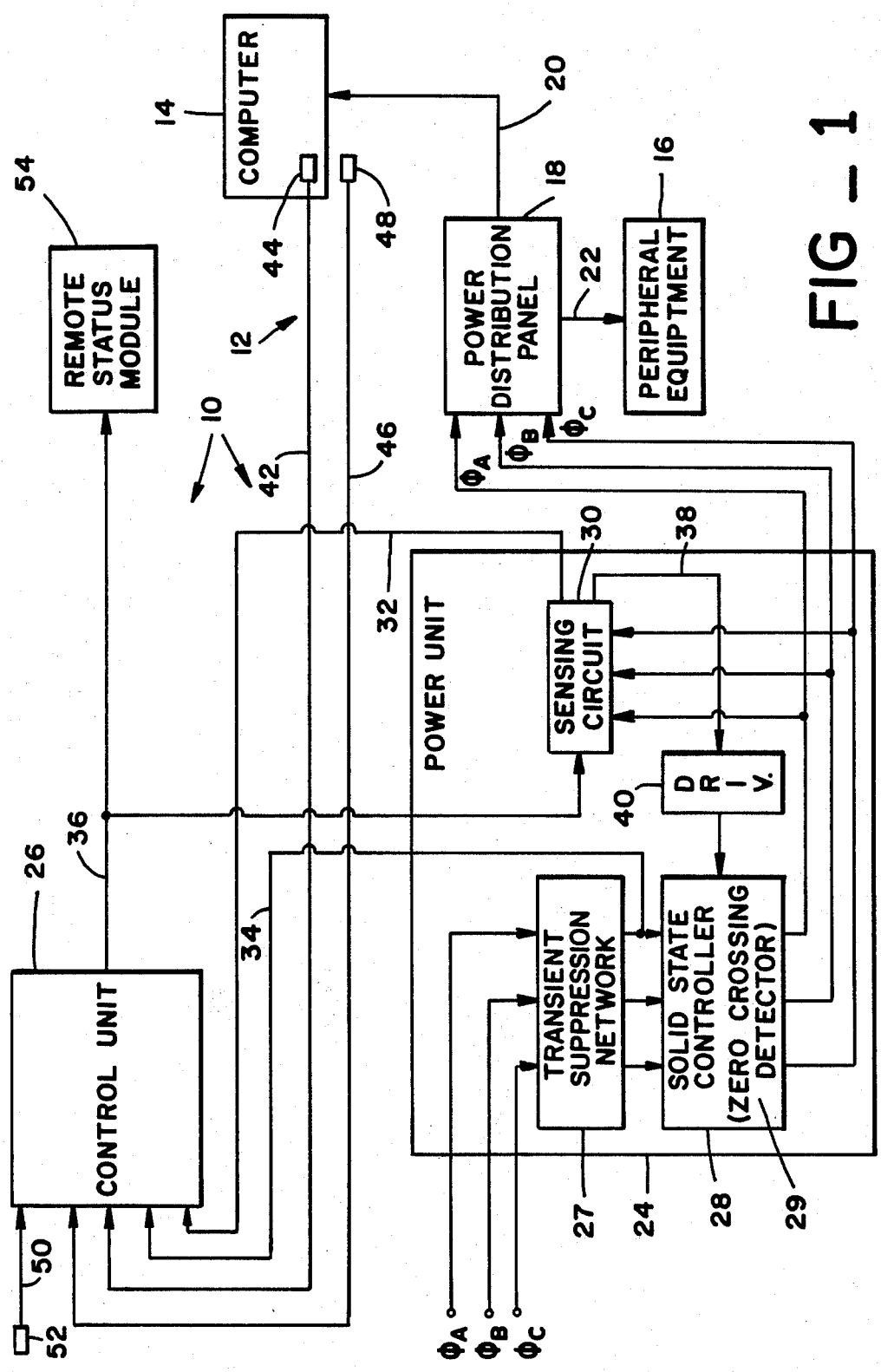
FIG. 1 is a block diagram of the present invention.

FIG. 1 shows an apparatus or system 10 for protecting another system 12 which may have a plurality of devices such as a computer 14, a disk drive or other peripheral equipment 16, and a computer system power distribution panel 18 for distributing power to the computer 14 over a line 20 and to the peripheral equipment over a line 22. While the system 10 will be described in connection with protecting a computer system 12, it can be used to protect any other type of system or device.

System 10 has a power unit 24 and a system control unit 26. Power unit 24 receives a 3-phase power supply over three lines $\phi_A$, $\phi_B$, $\phi_C$, couples the power through a transient suppression network 27 and outputs the power via a 3-phase solid state controller 28 to the distribution panel 18. Transient suppression network 27 stops externally generated transients from entering the computer system 12, which otherwise could cause data transfer errors and stressed or destroyed computer components. Solid state controller 28 has a zero-crossing detector 29 which prevents the output of the power supply or the shutdown of the power supply until the voltage waveform of the power supply passes through 0 to minimize internally generated transients at start-up or shutdown.

A phase sequence and phase loss sensing circuit 30 of power unit 24 receives the 3-phase power over lines $\phi_A$, $\phi_B$, $\phi_C$ at the output of controller 28 for sensing either phase rotation or phase loss, either of which constitutes a power supply fault condition against which the computer system 12 should be protected. In response to a phase rotation or phase loss condition, circuit 30 reacts by producing a phase fault signal $\overline{PF}$ over a control line 32 that is coupled as an input to system control unit 26.

A line 34 couples one phase of the 3-phase power supply, for example, $\phi_A$, to the system control unit 26. The phase $\phi_A$ is used by control unit 26 for monitoring and reacting to overvoltage and undervoltage conditions, multiple power interrupts and power failure, which also are external power supply fault conditions. An advantage to monitoring $\phi_A$ via line 34 is that the actual power supply to the computer system 12 is detected, as opposed to monitoring the power company or house line power which might not exhibit any fault condition at that location. Furthermore, $\phi_A$ on line 34 is converted by system control unit 26 to a suitable power supply for the logic circuit components of the unit 26 to be described below.

System control unit 26 generates a drives-on control signal $\overline{DO}$ which is outputted over a control line 36 to sensing circuit 30, which then couples $\overline{DO}$ over a line 38 to gate drivers 40 as a gate drives signal $\overline{GD}$. Gate drivers 40 respond to $\overline{GD}$ by enabling or disabling controller 28, thereby driving on or driving off the 3-phase power supply to computer system 12. In response to the absence of all of the above power supply fault conditions, $\overline{DO}$ and hence $\overline{GD}$ are at logic 0 to cause gate drivers 40 to drive on controller 28. In response to the presence of any one or more of the above power supply fault conditions, $\overline{DO}$ and hence $\overline{GD}$ are at logic 1 to cause gate drivers 40 to drive off controller 28. Thus, as will become apparent, logic signals such as $\overline{DO}$ and $\overline{GD}$, which are 5-volt logic signals, are used to control the supply of high voltage 3-phase power via gate drivers 40 and solid-state controller 28 to computer system 12.

With respect to external environmental fault conditions, control unit 26 receives temperature data over a line 42 from a temperature sensor 44, computer room water/humidity data over a line 46 from a sensor 48, and computer room smoke/particulate data over a line 50 from a sensor 52. For reasons which will be described below, temperature sensor 44, rather than sensing room air temperature, is located at the cooling air input duct of the computer 14. Sensor 48 is located at the floor on which the computer 14 is located to monitor for any possible water damage to the computer 14, while sensor 52 is strategically located in the computer room to perform its function. In response to any of these external environmental fault conditions, control unit 26 generates a logic 1 $\overline{DO}$ on line 36 to drive off the 3-phase power supply to computer system 12. If the computer environment has not reached a fault condition, $\overline{DO}$ will be a logic 0 and the power will be supplied to the computer system 12.

Also shown in FIG. 1 is an optional remote alarm or status module (RSM) 54 which receives $\overline{DO}$ via line 36. RSM 54 can be, for example, located up to 1000 feet from the computer system 12 to provide a remote indication of a fault condition.

Figure 2:
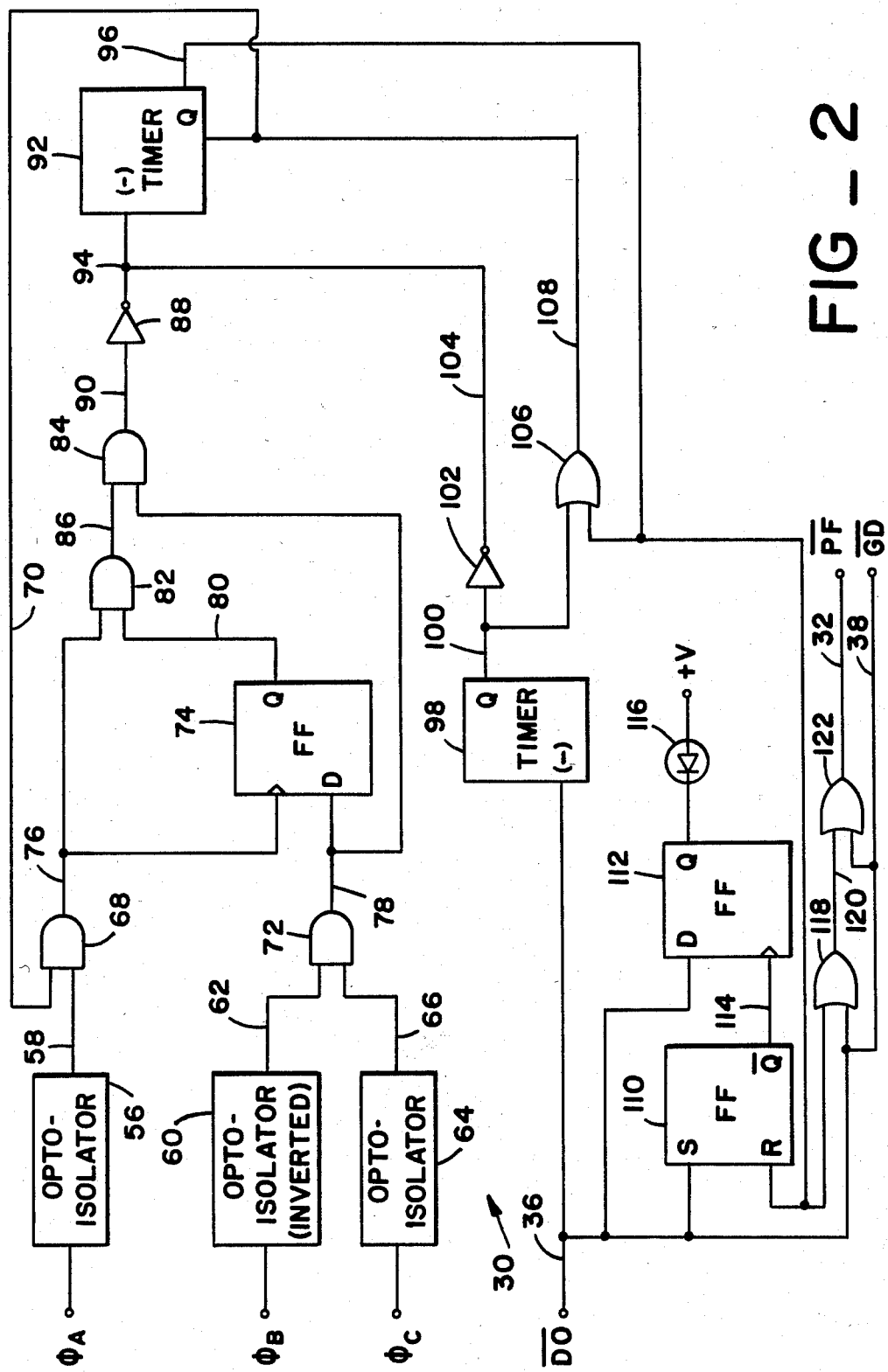
FIG. 2 is a schematic illustration of one circuit of the present invention.

FIG. 2 shows the phase sequence and phase loss sensing circuit 30 which can be implemented on a printed circuit board or card that is housed in power unit 24. Circuit 30, as illustrated in FIG. 2, inputs the 3-phase power supply over lines $\phi_A$, $\phi_B$, $\phi_C$ and inputs $\overline{DO}$ over line 36. Sensing circuit 30 outputs $\overline{PF}$ on line 32 and $\overline{GD}$ on line 38.

An opto-isolator 56 converts $\phi_A$ to a square wave output (non-inverted) on a line 58. An opto-isolator 60 converts $\phi_B$ to an inverted square wave output on a line 62, while an opto-isolator 64 converts $\phi_C$ to a square wave output (non-inverted) on a line 66. An AND gate 68 has one input connected to line 58 and another input connected to a line 70. An AND gate 72 has one input connected to line 62 and another input connected to line 66. A flip-flop 74 has its clock input coupled to the output of gate 68 over a line 76 and its data input coupled to the output of gate 72 over a line 78. The output Q of flip-flop 74 is coupled over a line 80 to an AND gate 82, whose other input is connected to line 76. An AND gate 84 has one input connected to the output of gate 82 over a line 86, another input connected to line 78 and an output coupled to an inverter 88 over a line 90.

A retriggerable timer 92 has a (−) trigger input coupled to the output of inverter 88 through an OR junction 94 and an output Q coupled to a line 96. Timer 92 has, for example, a 150 msec. timing constant. A timer 98 has an output Q coupled over a line 100 to an inverter 102, whose output over a line 104 is connected to OR junction 94 to trigger timer 92. Timer 98 has a (−) trigger input coupled to the line 36 carrying $\overline{DO}$ and has, for example, a 50 msec. timing constant. An OR gate 106 has one input coupled to line 96, another input coupled to line 100 and an output coupled to a line 108 leading to a reset or enabling input of timer 92 and to line 70 leading to gate 68.

A flip-flop 110 has its set input coupled to line 36 carrying $\overline{DO}$ and its reset input coupled to line 96. The output Q of flip-flop 110 is connected to the clock input of a flip-flop 112 over a line 114, whose data input is connected to line 36. The output Q of flip-flop 112 is used to drive on an LED 116, which is located on power unit 24, only when a phase fault occurs.

An OR gate 118 has one input coupled to line 96, another input coupled to line 36 and an output connected over a line 120 as one input to an OR gate 122. The other input to gate 122 is $\overline{DO}$ on line 36. The output of gate 122 is coupled to line 32 carrying $\overline{PF}$. As shown, line 38 carrying $\overline{GD}$ is directly connected to line 36 carrying $\overline{DO}$.

In the operation of sensing circuit 30, first assume that there is no external fault condition, i.e., $\overline{DO}$ is at logic 0, and, in particular, that there is no phase rotation or phase loss. With $\overline{DO}$ at logic 0, $\overline{GD}$ is at logic 0 and, hence, 3-phase power can be supplied to opto-isolators 56, 60, 64 via solid state controller 28. $\overline{DO}$ also sets flip-flop 110 to produce a logic 0 on line 114. $\overline{DO}$ also triggers timer 98 which then outputs a logic 1 on line 100 for 50 msec. Consequently, timer 92 is enabled via the coupling of this logic 1 through gate 106 onto line 108, as is gate 68 via line 70. Also, this logic 1 on line 100 is inverted by inverter 102 onto line 104 to initially trigger timer 92 via junction 94. Timer 92 then initially outputs on line 96 a logic 1 for 150 msec., which is coupled through OR gate 106 onto line 108 to maintain timer 92 enabled in anticipation of additional triggering and to maintain gate 68 enabled.

With $\phi_A$ being detected by opto-isolator 56, and gate 68 being enabled, the pulses on line 76 clock flip-flop 74. Also, with $\phi_B$ being detected and inverted by opto-isolator 60 and $\phi_C$ being detected by opto-isolator 64, the pulses on line 62 and line 66 are in phase, so that gate 72 outputs on line 78 logic 1 data inputs to flip-flop 74 which also are in phase with the clock pulses on line 76. Therefore, flip-flop 74 continually outputs logic 1 pulses on line 80, leading to gate 82 which is enabled by the logic 1 pulses on line 76. Consequently, gate 84 is enabled by the logic 1 pulses on line 86 and on line 78 to produce logic 1 pulses on line 90 which are inverted by inverter 88 to continually trigger timer 92 via junction 94. As long as the phases $\phi_A$, $\phi_B$, $\phi_C$ are in phase or there is no loss of a phase, timer 92 will continually be retriggered within the 150 msec. pulse duration of the logic 1 output on line 96, i.e., short periods of phase loss or phase rotation tolerable by the protected system 12 may occur before there is a time out of timer 92 since retriggering pulses nominally occur at the phase frequency (60 Hz), so that this output will be continually generated on line 96. Thus, for the exemplary predetermined 150 msec. pulse duration of the timer 92, short periods of phase loss or phase rotation up to approximately 130 msec. are tolerated.

The logic 1 pulse on line 96 is coupled through gate 118 and gate 122 to produce a logic 1 $\overline{PF}$, thereby indicating no phase fault.

Assume now that a phase rotation occurs, i.e., the phases $\phi_A$, $\phi_B$, $\phi_C$ are out of sequence. If $\phi_A$ rotates relative to $\phi_B$ and $\phi_C$, then flip-flop 74 will not be clocked at the time a logic 1 is produced on line 78. Or, if $\phi_B$ rotates relative to $\phi_C$, gate 72 will produce a logic 0 on line 78 at the time flip-flop 74 is clocked. If either phase rotation event occurs, line 80 will go to logic 0 to disable gate 82, resulting in gate 84 being disabled and inverter 88 producing a logic 1 at OR junction 94. Consequently, timer 92 will time out after 150 msec. since it will not be retriggered, resulting in line 96 going to a logic 0. This logic 0 resets flip-flop 110 to clock flip-flop 112, with the logic 0 data input $\overline{DO}$ at this time being switched to output Q to energize LED 116, thereby indicating a phase fault condition.

Moreover, $\overline{PF}$ on line 32 goes to logic 0 via gate 118 and gate 122. In response to a logic 0 $\overline{PF}$, as will be described below, $\overline{DO}$ on line 36 then goes to logic 1, as does $\overline{GD}$. Thus, gate drivers 40 (see FIG. 1) will drive off the supply of 3-phase power to computer system 12.

A similar operation occurs should there be a loss of $\phi_A$ or $\phi_B$ or $\phi_C$. If $\phi_A$ is lost, gate 68 and gate 82 will become disabled and flip-flop 74 will not be clocked. If $\phi_B$ or $\phi_C$ is lost, gate 72 will become disabled and flip-flop 80 will produce a logic 0 on line 80 to disable gate 82. Also, gate 84 will become disabled. Thus, timer 92 will time out with the same phase fault result as described above.

Figure 3:
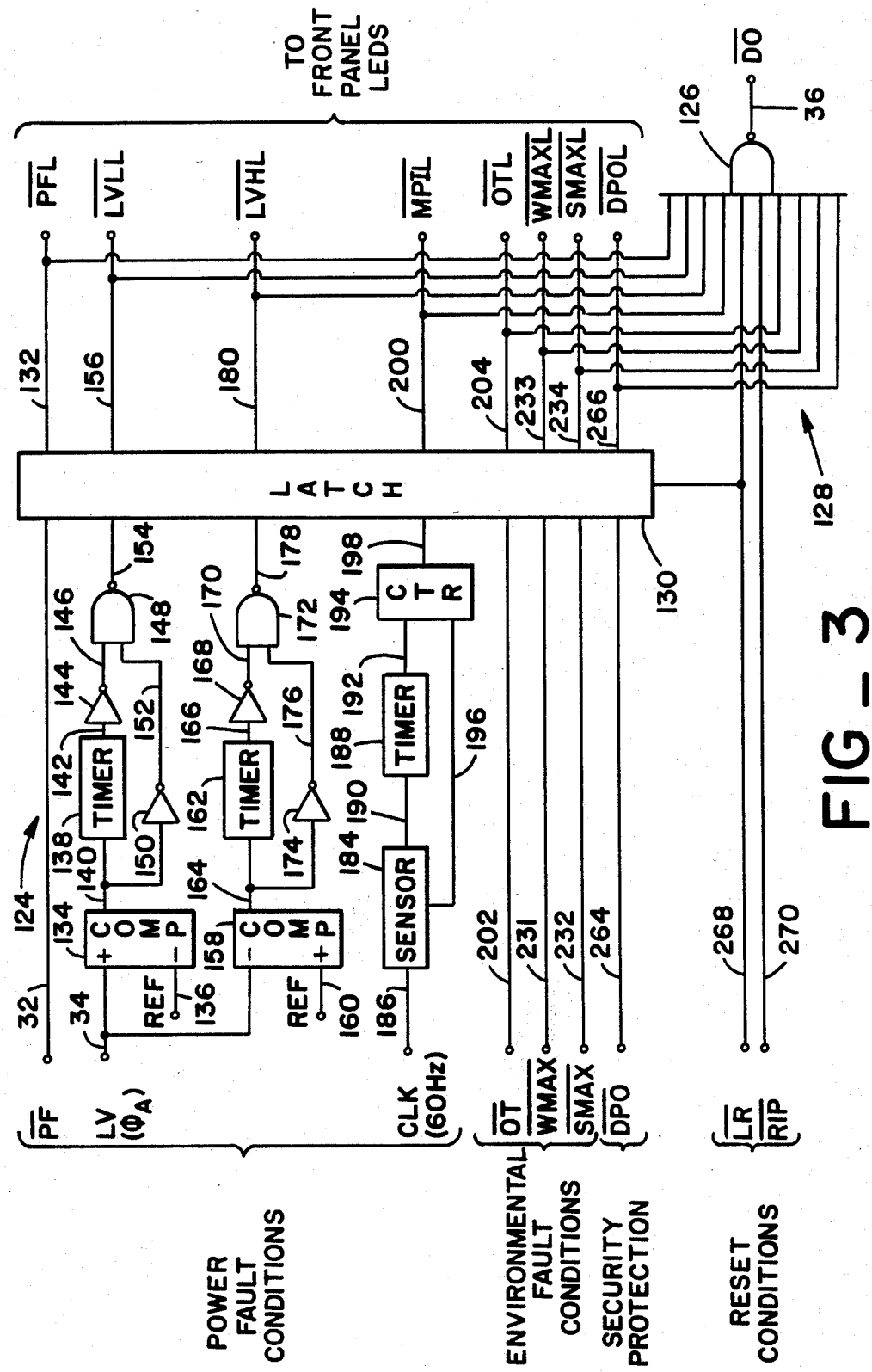
FIG. 3 shows a schematic illustration of another circuit of the present invention.

FIG. 3 shows a circuit 124 for producing $\overline{DO}$ on line 36 in response to any one of a number of inputs, including $\overline{PF}$ on line 32, as will be described below. A NAND gate 126 has its output coupled to line 36 and a plurality of inputs shown generally at 128, several of which are coupled to the output of a latch 130. When all the inputs 128 to gate 126 are logic 1, representing a normal condition, i.e., no power supply, environmental or unauthorized access fault conditions, or no reset conditions to be described, $\overline{DO}$ is at logic 0 to continue the supply of 3-phase power to computer system 12. When any one of the inputs 128 is logic 0, representing a fault or a reset condition, $\overline{DO}$ is at logic 1 to discontinue the supply of power to computer system 12.

The $\overline{PF}$ produced on line 32 by circuit 30 shown in FIG. 2 is inputted to circuit 124 and stored in latch 130. Thus, latch 130 provides as one input 128 to gate 126 on a line 132 a phase fault latched signal $\overline{PFL}$. When $\overline{PFL}$ is at logic 0, gate 126 outputs a logic 1 $\overline{DO}$ on line 36. When $\overline{PFL}$ is at logic 1, $\overline{DO}$ can be at logic 0, depending on the logic state of the other inputs 128.

Circuit 124 also has an input connected to the line 34 carrying a line voltage signal LV derived from $\phi_A$ for purposes of detecting an overvoltage or undervoltage fault condition. A low voltage comparator 134 has its non-inverting input coupled to line 34 and its inverting input coupled to a line 136 carrying a low voltage reference signal. An adjustable timer 138 is normally disabled and held in a high logic 1 state by the output of comparator 134 over a line 140 to produce a logic 1 output on a line 142 which is inverted by an inverter 144 and applied over a line 146 as one input to a NAND gate 148. The other input to gate 148 is coupled to the output of an inverter 150 over a line 152, whose input is connected to line 140. Gate 148 produces an output on a line 154 which is stored in latch 130 as a line voltage low signal $\overline{LVL}$. Latch 130 outputs the latched signal as $\overline{LVLL}$ on a line 156 as an input 128 to gate 126.

A high voltage comparator 158 has its inverting input coupled to line 34 and its non-inverting input coupled to a line 160 carrying a high voltage reference signal. An adjustable timer 162 is normally disabled and held in a logic 1 state by the output of comparator 158 over a line 164 to produce a logic 1 output on a line 166 which is inverted by an inverter 168 and applied over a line 170 as one input to a NAND gate 172. The other input to gate 172 is coupled to the output of an inverter 174 on a line 176, whose input is connected to line 164. Gate 172 produces an output on a line 178 which is stored in latch 130 as a line voltage high signal $\overline{LVH}$. Latch 130 outputs the latched signal as $\overline{LVHL}$ on a line 180 as an input 128 to gate 126.

In operation, with power being outputted by the transient suppression network 27 (see FIG. 1), LV is applied on line 34 to the input of comparator 134 and comparator 158. If the line voltage is within an acceptable range, i.e., it is above the undervoltage fault condition represented by the reference voltage on line 136, and below the overvoltage fault condition represented by the reference voltage on line 160, comparator 134 and comparator 158 output a logic 1 on line 140 and line 164, respectively. In response, inverter 150 produces a logic 0 at gate 148 on line 152 and inverter 174 produces a logic 0 at gate 172 on line 176. Therefore, a logic 1, which is produced on line 154 and line 178, is stored in latch 130 and $\overline{LVLL}$ on line 156 is high, as is $\overline{LVHL}$ on line 180.

If the line voltage falls to an undervoltage condition, comparator 134 produces a logic 0 on line 140 which is inverted by inverter 150 and provided as a logic 1 on line 152 to one input of gate 148. Also, timer 138 is enabled and will time out after a preset period, producing at that time a logic 0 on line 142, which is inverted by inverter 144 onto line 146 as a logic 1. Thus, until timer 138 times out, line 154 remains at logic 1 and $\overline{LVLL}$ on line 156 is still high. At the end of the pulse duration, i.e., when timer 138 times out, line 142 goes to logic 0 and line 146 to logic 1. If at this time line 152 still is at logic 1 due to the undervoltage condition occurring for the time out period of timer 138, line 154 goes to logic 0, which is now stored in latch 130 as a logic 0 $\overline{LVLL}$ and outputted on line 156. Hence, $\overline{DO}$, via gate 126, goes to logic 1 and the supply of 3-phase power to computer system 12 will be discontinued.

A similar operation occurs to produce a logic 0 $\overline{LVHL}$ if an overvoltage condition exists at least for the time out delay of timer 162 when it is enabled. When the overvoltage condition occurs, LV on line 34 is higher than the reference voltage on line 160, so that comparator 158 produces the logic 0 on line 164 to enable timer 162. When timer 162 times out, if the overvoltage condition still exists, line 170 and line 176 will be at logic 1, so that line 178 goes to logic 0 and $\overline{LVHL}$ stored in latch 130 and outputted on line 180 is at logic 0. Thus, $\overline{DO}$ via gate 126 goes to logic 1 to discontinue the supply of 3-phase power to computer system 12.

While the undervoltage and overvoltage conditions are fault conditions that can cause damage to the computer system 12, the undervoltage condition usually can be tolerated for a longer period of time relative to the overvoltage condition. Consequently, at installation, the timer 138 and timer 162 can be adjusted to time out at a longer and shorter period, respectively. The time out period of timer 138 and timer 162 will depend on the particular computer system 12 and its tolerance to undervoltage and overvoltage conditions.

Another power fault condition that system 10 monitors and reacts to is multiple power interrupts (MPI). For any number of well-known reasons, such as downed power lines or overloads seen by the public utility supplying power, a rapid succession of power interrupts can occur that can cause damage to the computer system 12. In describing the manner in which system 10 protects against this fault condition, note should be made that a 60 Hz clock used by system 10 is generated in response to the power supply and will be discontinued in response to an interrupt.

Circuit 124, therefore, has a sensor 184 which receives and senses the 60 Hz clock on a line 186. A timer 188 is triggered by an output of sensor 184 over a line 190 to produce a timing signal on an output line 192 that enables a counter 194 for the duration of the signal on line 192. Each time a power interrupt occurs, sensor 184 outputs a pulse on a line 196 that is counted by counter 194. If counter 194 does not count a predetermined number of pulses on line 196 within the duration of the timing signal on line 192, a logic 1 is continually produced on an output line 198, stored in latch 130 and outputted on a line 200 as a logic 1 $\overline{MPIL}$. If counter 194 does count the predetermined number of pulses on line 196 within this pulse duration, a logic 0 is produced on line 198, stored in latch 130 and outputted on line 200 as a logic 0 $\overline{MPIL}$. The predetermined count of counter 194 can be, for example, a count of 2.

In operation, when sensor 184 senses a first power interrupt, i.e., the 60 Hz clock goes down, an output is produced on line 190 to trigger timer 188 and, thereby, enable counter 194 for the duration of the pulse on line 192. Sensor 184 also produces a first pulse on line 196 that is counted by counter 194. Then, should the 60 Hz power return and then another power interrupt occur during this pulse duration on line 192, it will be counted by counter 194 via another output on line 196. Consequently, line 198 goes to logic 0 and $\overline{MPIL}$ is latched in latch 130 as a logic 0, resulting in $\overline{DO}$ going to logic 1 via line 200 and gate 126 to discontinue the supply of power to the computer system 12. If the second power interrupt does not occur within the duration of the pulse on line 192, timer 188 will time out to clear counter 194. Line 198 and, hence, $\overline{MPIL}$ will remain at logic 1. Then, should an interrupt occur again at a later time, this will be sensed by sensor 184, timer 188 again will be triggered and counter 194 again will begin counting the interrupts represented by the pulses on line 196. Timer 188 can have a timing constant or pulse duration of, for example, 150 msec.

Figure 4:
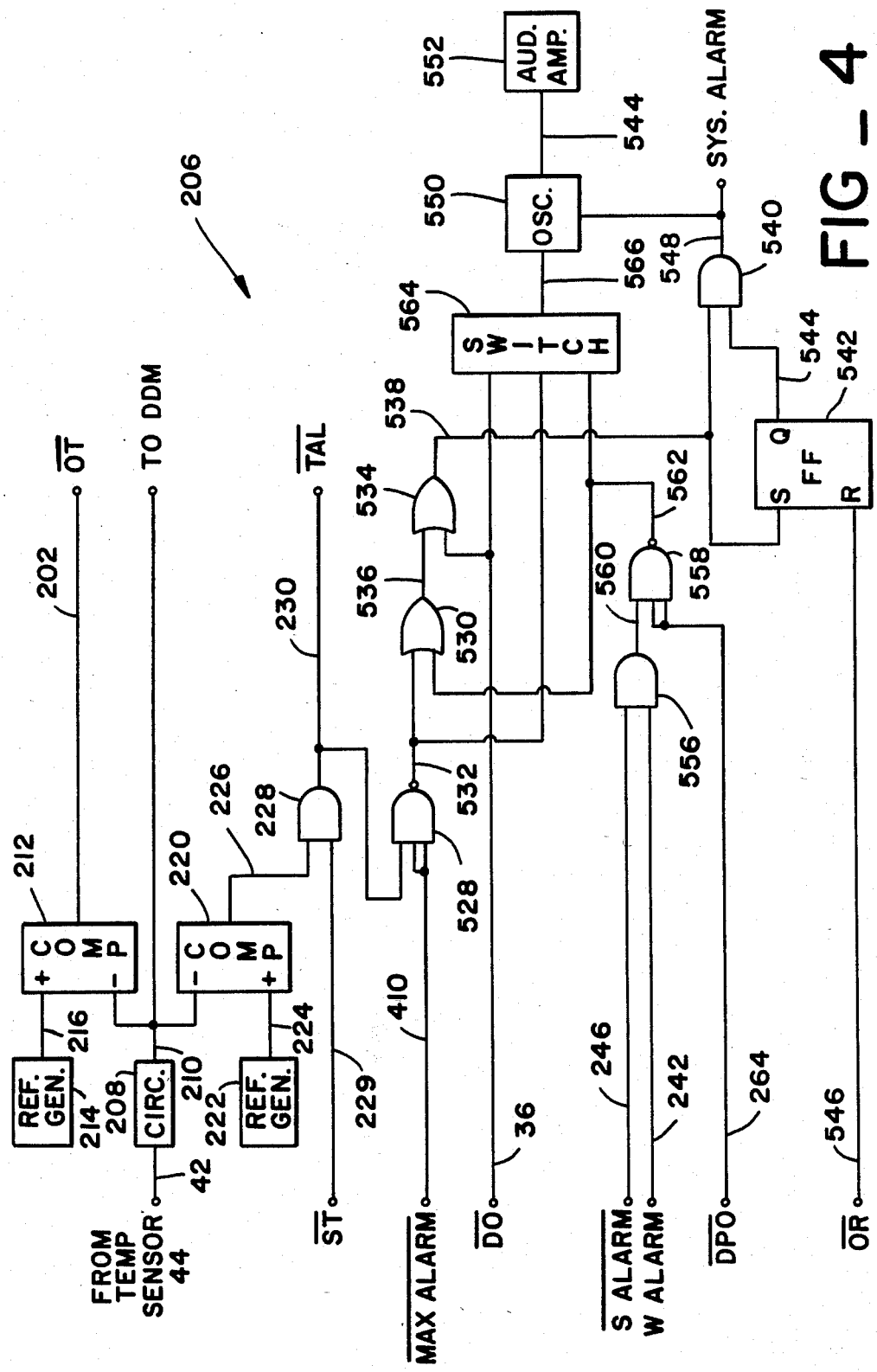
FIG. 4 illustrates schematically yet another circuit of the present invention.

In connection with the environmental fault conditions, circuit 124 also inputs on a line 202 an overtemperature signal $\overline{OT}$ that is stored in latch 130 and outputted on a line 204 as $\overline{OTL}$ and as one of the inputs 128 to gate 126. FIG. 4, to which reference now will be made, shows a circuit 206 which, among other functions to be described below, generates $\overline{OT}$ on line 202. A signal conditioner and calibration circuit 208 of circuit 206 receives a temperature signal from the sensor 44 (see FIG. 1) over the line 42 and outputs a conditioned and calibrated temperature signal on a line 210. The signal on line 210 is coupled to a digital display module DDM to be described below to display the temperature.

A comparator 212 has its inverting input coupled to line 210 and its non-inverting input coupled to a presettable reference voltage generator 214 over a line 216. Reference voltage generator 214 is used to set a reference voltage on line 216 representing an overtemperature condition, e.g., 80° F. The output of comparator 212 is coupled to line 202 carrying $\overline{OT}$. Another comparator 220 has its inverting input coupled to line 210 and its non-inverting input connected to a presettable reference voltage generator 222 over a line 224. Reference voltage generator 222 is used to set a reference voltage on line 224 representing an alarm or temperature-at-limit-condition, e.g., 77° F. The output of comparator 220 is provided on a line 226 as one input to an AND gate 228. Another input to gate 228 on a line 229 is a system test signal $\overline{ST}$ to be described more fully below and which is normally at logic 1. The output of gate 228 on a line 230 is a temperature-at-limit signal $\overline{TAL}$.

In operation, if the temperature at the computer 14 is below an overtemperature fault condition, the reference voltage on line 216 is higher than the signal on line 210. Therefore, comparator 212 produces a logic 1 $\overline{OT}$ on line 202 which is stored in latch 130 and outputted on line 204 of FIG. 3 as a logic 1 $\overline{OTL}$. If the temperature rises above the overtemperature fault condition, comparator 212 switches state to produce a logic 0 $\overline{OT}$ on line 202, which is stored in latch 130 as a logic 0 $\overline{OTL}$. Thus, line 204 goes to logic 0, resulting in gate 126 producing a logic 1 $\overline{DO}$ to discontinue the supply of power to computer system 12.

If the temperature is above the temperature represented by the reference voltage on line 224, comparator 220 switches state to produce a logic 0 on line 226. Therefore, gate 228 is disabled to produce a logic 0 $\overline{TAL}$ on line 230, which is used for alarm purposes to be described below.

Thus, in the example given above, when the temperature rises to 77° F., an alarm will be given in response to the logic 0 $\overline{TAL}$. Then, should the temperature rise to 80° F., the computer power supply will be discontinued in response to the logic 0 $\overline{OT}$.

Circuit 124 of FIG. 3 also shows an input line 231, which carries a water/humidity maximum signal $\overline{WMAX}$, and an input 232 which carries a smoke/particulates maximum signal $\overline{SMAX}$. Signals $\overline{WMAX}$ and $\overline{SMAX}$ are stored in latch 130 and outputted on line 233 and line 234, respectively, as $\overline{WMAXL}$ and $\overline{SMAXL}$. Should excessive water accumulate under the computer 14 or should the humidity of the air in the computer room reach a maximum level for a predetermined period of time, or should the smoke or particulates in the computer room reach a maximum for a predetermined period of time, as will be described in connection with FIG. 5, then a logic 0 $\overline{WMAX}$ or $\overline{SMAX}$ is outputted onto line 231 or line 232 and stored in latch 130. Thus, line 233 or line 234 go to logic 0, resulting in gate 126 outputting a logic 1 $\overline{DO}$. If these environmental fault conditions are not reached for this period of time, then $\overline{WMAXL}$ and $\overline{SMAXL}$ are at logic 1.

Figure 5:
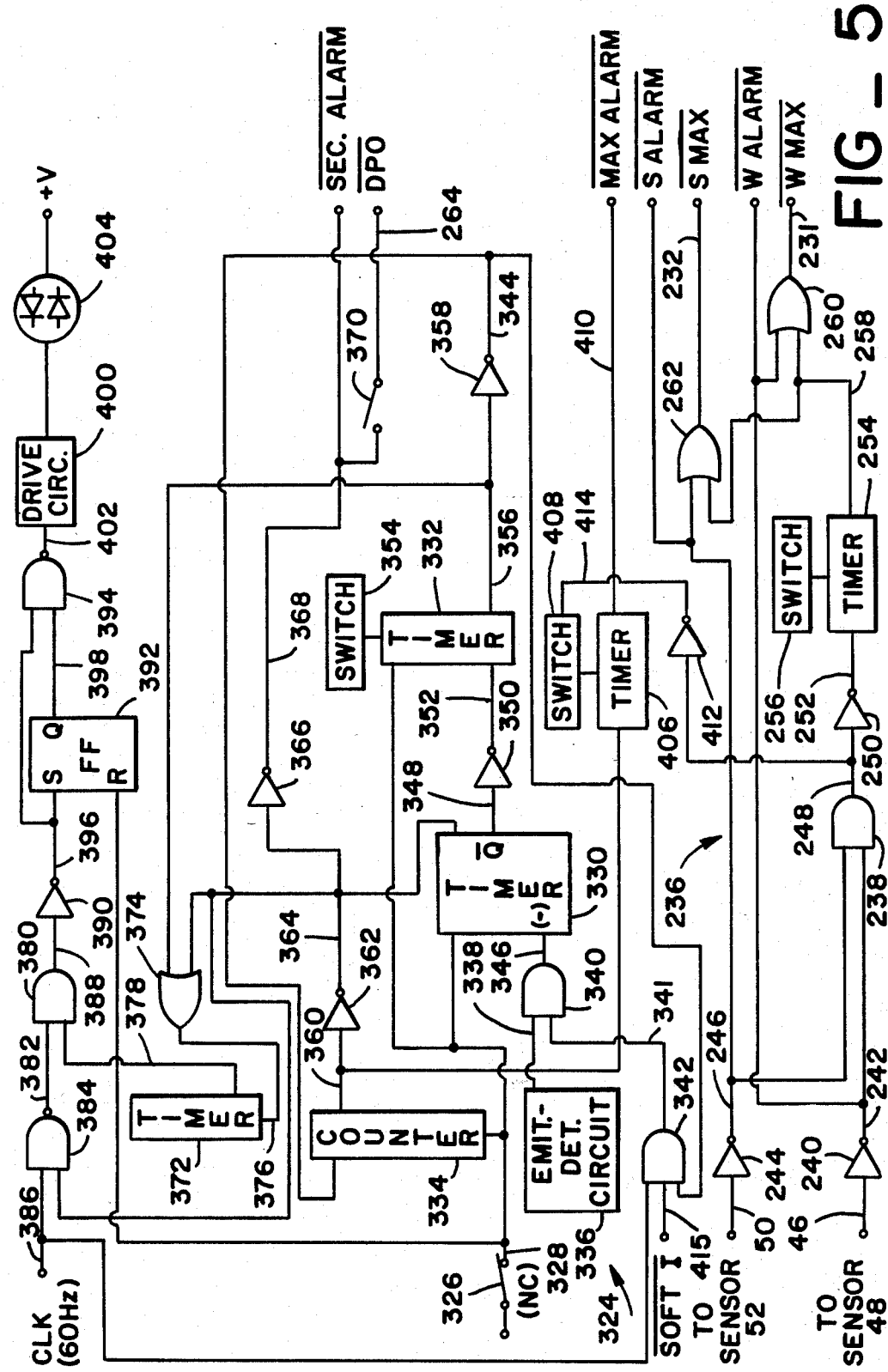
FIG. 5 is a schematic view of another circuit of the present invention.

FIG. 5 shows a circuit 236 for producing $\overline{WMAX}$ on the line 231 in response to the output of water/humidity sensor 48 on line 46. Circuit 236 also produces $\overline{SMAX}$ on the line 232 in response to the output of smoke/particulates sensor 52 on line 50. An AND gate 238 of circuit 236 has one input connected to the output of an inverter 240 over a line 242, whose input is the line 46. The other input of gate 238 is coupled to the output of an inverter 244 over a line 246, whose input is the line 50. Gate 238, when enabled, produces a logic 1 output on a line 248 that is inverted by an inverter 250 onto a line 252 to disable a timer 254. A dip switch 256 is used to set the time constant or time out delay of the timer on a line 258, which is, for example, 15 seconds.

An OR gate 260 has one input coupled to line 258, another input coupled to line 242 and an output coupled to line 231. An OR gate 262 has one input coupled to line 258, another input coupled to line 246 and an output coupled to line 232.

In the operation of circuit 236, if there is no environmental fault condition due to excessive water/humidity or smoke/particulates, line 46 and line 50 are each at logic 0. Inverter 240 inverts the logic 0 on line 46 to a logic 1 on line 242, which is coupled through OR gate 260 as a logic 1 $\overline{WMAX}$. Inverter 244 inverts the logic 0 on line 50 to a logic 1 on line 246, which is coupled through OR gate 262 as a logic 1 $\overline{SMAX}$. Also, gate 238 remains enabled by the logic 1 on line 242 and line 246 to produce a logic 1 on line 248. The output of gate 238 is inverted by inverter 250 and disables timer 254 via line 252. The output of timer 254 on line 258, therefore, remains in a logic 1 state.

Then, if excessive water/humidity or excessive smoke/particulates is detected by sensor 48 or sensor 52, line 46 or line 50 goes to logic 1 and gate 238 becomes disabled via line 242 or line 246 going to logic 0. Therefore, line 248 goes to logic 0 and line 252, via inverter 250, goes to logic 1 to enable timer 254. Consequently, line 258 stays at logic 1 for 15 seconds and this is coupled through gate 260 and gate 262 as a logic 1 $\overline{WMAX}$ and a logic 1 $\overline{SMAX}$. At the end of this 15 second duration, line 258 goes to logic 0. If, at this time the water/humidity or smoke/particulate fault condition is still occurring, then line 242 is still logic 0 or line 246 is still logic 0. Hence, both inputs to gate 260 are logic 0 and both inputs to gate 262 are logic 0, so that a logic 0 $\overline{WMAX}$ on line 231 or a logic 0 $\overline{SMAX}$ on line 232 is produced, ultimately resulting in $\overline{DO}$ going to logic 1 to discontinue the supply of 3-phase power to computer system 12. If, however, when timer 254 times out these environmental fault conditions do not exist, then $\overline{WMAX}$ and $\overline{SMAX}$ will be logic 1 due to the logic 1 on line 242 and line 246. One purpose for delaying the generation of the logic 0 $\overline{WMAX}$ or $\overline{SMAX}$ after an environmental fault condition is detected by sensor 48 and sensor 52 is to avoid discontinuing the supply of power due to short-term effects, such as the dropping of a cup of water near sensor 48 or the presence of cigarette smoke near sensor 52.

However, while the 3-phase power supply is not immediately turned off, as mentioned above, circuit 236 does immediately produce a logic 0 $\overline{WALARM}$ (water alarm) signal on line 242 or a logic 0 $\overline{SALARM}$ (smoke alarm) signal on line 246, in response to the onset of an environmental fault condition. These signals are used to produce immediately an audible and visible alarm or warning signal, as will be further described.

In connection again with circuit 124 of FIG. 3, an input line 264 carries a delayed power-off signal $\overline{DPO}$ that is stored in latch 130. The latched signal $\overline{DPOL}$ is outputted on a line 266 as an input 128 to gate 126. $\overline{DPO}$ is produced in connection with the fault condition relating to unauthorized access to the computer system 12, as will be further described. As long as there is no unauthorized access, $\overline{DPO}$ and hence $\overline{DPOL}$ is at logic 1. Upon unauthorized access to computer system 12, $\overline{DPO}$ and $\overline{DPOL}$ go to logic 0 to produce logic 1 $\overline{DO}$ via gate 126.

Circuit 124 also shows an input line 268 receiving a latch reset signal $\overline{LR}$ which is coupled to latch 130 and as an input 128 to gate 126. Circuit 124 also has an input line 270 carrying a reset-in-progress signal $\overline{RIP}$ which is coupled as an input 128 to gate 126. When $\overline{LR}$ is at logic 0, latch 130 is reset, so that all inputs 128 from latch 130 are held at logic 1, but a logic 0 is inputted on line 268 to gate 126 to produce a logic 1 $\overline{DO}$. When $\overline{LR}$ is at logic 1, the reset is removed and latch 130 can latch the various input signals such as $\overline{PF}$ and $\overline{OT}$, as previously described. When $\overline{RIP}$ is at logic 0, gate 126 also outputs a logic 1 $\overline{DO}$.

Figure 6:
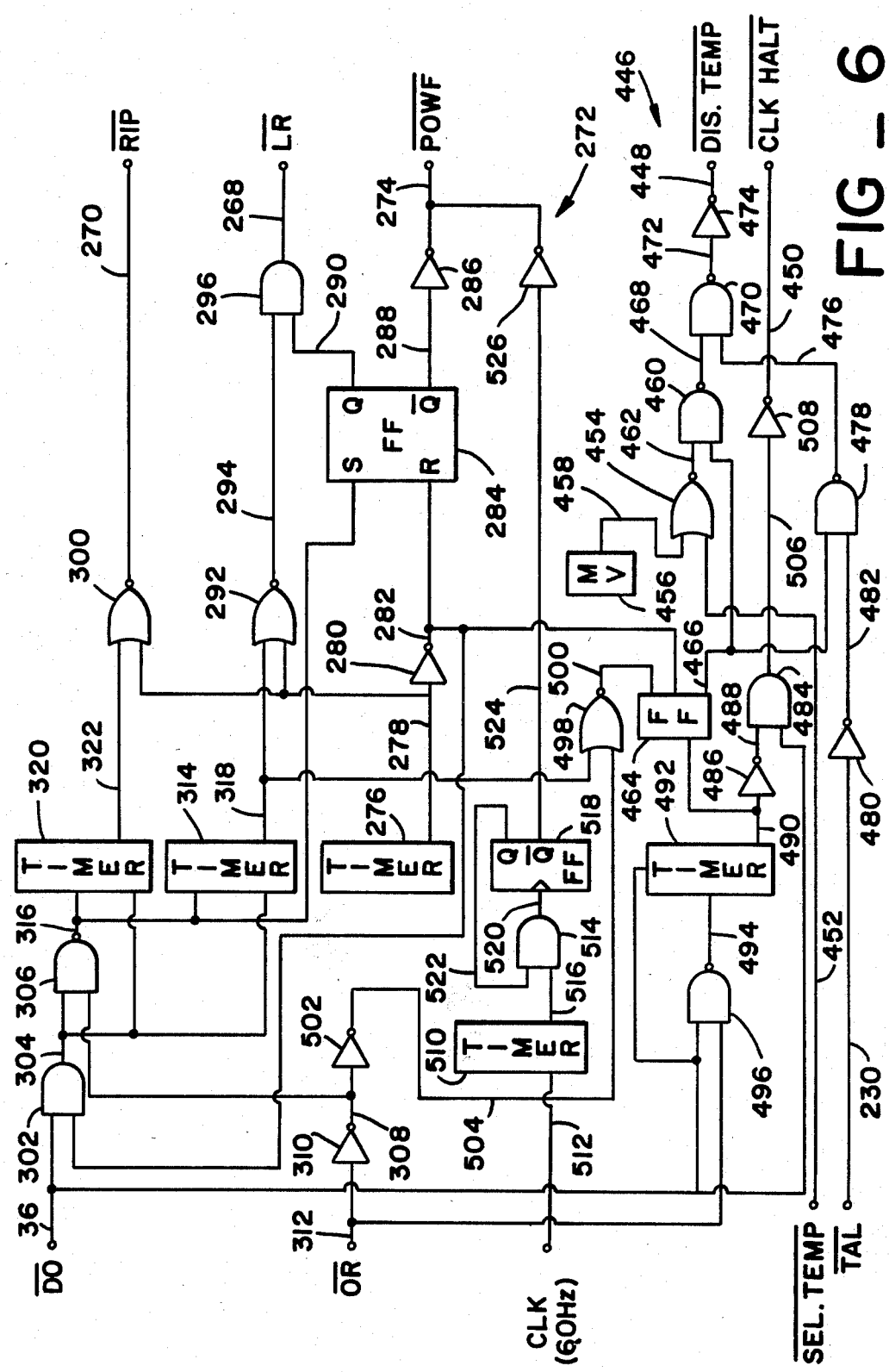
FIG. 6 illustrates schematically an additional circuit of the present invention.

FIG. 6 shows a circuit 272 for producing $\overline{LR}$ on line 268, $\overline{RIP}$ on line 270 and a power failure signal $\overline{POWF}$ on a line 274. A power-up timer 276, at power-up, automatically produces a logic 1 pulse on an output line 278. The pulse on line 278 is, for example, three minutes in duration, and is used to prevent the supply of 3-phase power to the computer system 12 at least for this period, for reasons to be described below. An inverter 280 has its input connected to line 278 and its output coupled over a line 282 to the reset input of a power-up flip-flop 284. An output $\overline{Q}$ of flip-flop 284 is coupled to an inverter 286 over a line 288, whose output on the line 274 is $\overline{POWF}$. The output Q of flip-flop 284 on a line 290 is then at logic 0.

A NOR gate 292 has one input connected to line 278 and an output coupled over a line 294 as one input to an AND gate 296. The other input to gate 296 is coupled to the output Q of flip-flop 284 over the line 290. Gate 296 outputs $\overline{LR}$ on line 268.

Thus, at power-up, the logic 1 pulse on line 278 from timer 276 is gated through gate 292 as a logic 0, which then disables gate 296, so that a logic 0 $\overline{LR}$ is produced on line 268 at least for this three-minute duration. When timer 276 times out after this three-minute period, line 278 goes to logic 0 and line 294 can go to logic 1 via gate 292, but line 290 stays at logic 0 since flip-flop 284 remains reset. Therefore, gate 296 is still disabled to produce a logic 0 $\overline{LR}$ on line 268 until, as will be described, an operator-initiated reset signal $\overline{OR}$ is produced.

Thus, with reference to FIG. 3, at power-up for the above-mentioned three-minute duration, $\overline{LR}$ is at logic 0 to reset latch 130. Therefore, all inputs 128 from latch 130 are at logic 1, but $\overline{LR}$ is at logic 0, resulting in $\overline{DO}$ being at logic 1 and the 3-phase power not being supplied to the computer system 12.

The reason for this three-minute delay before power can be supplied to the computer system 12 relates to a total power failure fault condition, e.g., when power from the power company is temporarily off, so that no power is supplied to the entire room in which the computer system 12 is located and the room air conditioner temporarily shuts down, causing increased room temperature. If this total power failure fault condition occurs, the power supply from controller 28 to computer system 12 will be discontinued, i.e., logic 0 $\overline{PF}$ and logic 1 $\overline{DO}$ are produced, and it then will be necessary to power up the system 10 again after power is restored to activate it. If this power-up is initiated by an operator shortly thereafter, the air surrounding sensor 44 at the computer input duct may have cooled sufficiently below the overtemperature condition. However, at such initiation of power, the internal components of computer 14 may not yet have had time to cool below the overtemperature fault condition. While these computer components can withstand an overtemperature condition without failing if they are not in operation, i.e., if the power supply is discontinued, they can fail if power is supplied during this condition. Consequently, the three-minute delay at power-up provides sufficient time for the internal computer components to cool before power is supplied by controller 28 to computer system 12.

With reference again to FIG. 6, a NOR gate 300 has one input connected to line 278 and an output connected to the line 270. Thus, during the three-minute duration of the pulse on line 278, gate 300 produces a logic 0 on line 270, which ensures that $\overline{RIP}$ stays at logic 0 at least for this period.

An AND gate 302 has one input coupled to line 36 carrying $\overline{DO}$ and another input coupled to the output of inverter 280 over line 282. The signal on line 282 prevents any operator resets during the three-minute time out period, as will become apparent. The output of gate 302 on a line 304 is coupled as one input to a NAND gate 306. The other input of gate 306 is coupled over a line 308 to the output of an inverter 310, whose input on a line 312 is the operator-initiated reset signal $\overline{OR}$. A timer 314 has its enabling input coupled to line 304 and its trigger input coupled to the output of gate 306 over a line 316. Timer 314, in response to being triggered, produces a logic 1 pulse of, for example, three seconds duration, on a line 318 which is another input to gate 292. A timer 320 has its enabling input coupled to line 304 and its trigger input coupled to line 316. Timer 320, in response to being triggered, produces a logic 1 pulse of, for example, six seconds duration, on a line 322 which is another input to gate 300.

As previously mentioned, during the initial three-minute period at power-up, line 278 is at logic 1 and, hence, line 282 is a logic 0, which disables gate 302. Flip-flop 284 is reset, so that $\overline{LR}$ is at logic 0 and, hence, $\overline{DO}$ is at logic 1 as an input to gate 302. Therefore, line 304 is at logic 0, which disables gate 306, whereby an operator initiated reset, i.e., $\overline{OR}$ at logic 0, is ineffective during this period. When timer 276 times out after this three-minute period, line 282 goes to logic 1, so that now line 304 is at logic 1 to enable gate 306. However, flip-flop 284 is still reset, whereby a logic 0 $\overline{LR}$ is still being generated and power still cannot be supplied to computer system 12.

Then, an operator initiated reset can occur and be effective, i.e., $\overline{OR}$ goes to logic 0, by depressing a reset button on the front panel of control unit 26, as will be described in connection with FIG. 8. Thus, line 308 goes to logic 1 via inverter 310 and gate 306 is enabled to produce a logic 0 on line 316. This sets flip-flop 284, so that line 290 goes to logic 1, but a logic 0 $\overline{LR}$ is still generated for another three seconds, as will now be described.

When line 316 goes to logic 0, timer 314 is triggered to produce the 3-second pulse on line 318, which is inverted by inverter 292 to produce a logic 0 on line 294 and disable gate 296, whereby $\overline{LR}$ is at logic 0. When timer 314 times out, line 294 goes to logic 1 and gate 296 is enabled, thereby changing $\overline{LR}$ to logic 1. Thus, $\overline{DO}$ is a logic 1 for an additional three seconds beyond the three-minute duration after power-up.

Also, timer 320 is triggered by the logic 0 on line 316 to produce the 6-second timing pulse on line 322. This is inverted by NOR gate 300 to produce a logic 0 $\overline{RIP}$ for 6 seconds. Thus $\overline{DO}$ remains at logic 1 for an additional 3 seconds since timer 320 times out 3 seconds after timer 314 times out. The reasons for this timing will be discussed below. Consequently, an operator reset must be initiated whenever a fault condition has terminated computer power.

As indicated in FIG. 1, a logic 1 $\overline{DO}$ on line 36 can be generated to discontinue the supply of power to computer system 12, yet power is still supplied to control unit 26 via line 34 ($\phi_A$). Latch 130 must be reset and no fault condition can exist to continue the power supply once the fault condition causing the logic 1 $\overline{DO}$ is eliminated. That is, there may not be a power-up condition causing the activation of timer 276 because the fault condition causing $\overline{DO}$ to go to a logic 1 may not have been a power failure or power loss, but, for example, a water/humidity fault condition. Therefore, to reset latch 130 and the overall control system 10, an operator initiates a logic 0 $\overline{OR}$ on line 312. Timer 276 has not been triggered, since this is not a power-up condition, so that line 282 via inverter 280 is at logic 1, as is line 36 since $\overline{DO}$ is a logic 1, whereby gate 302 and, consequently, gate 306, are enabled. Thus, the logic 0 on line 310 is inverted by inverter 310 to a logic 1 on line 308, resulting in the output of gate 306 on line 316 triggering timer 320 and timer 314 and setting flip-flop 284. Consequently, logic 0 $\overline{LR}$ and $\overline{RIP}$ are produced for 3 and 6 seconds, respectively.

The reason for a 3-second $\overline{LR}$ is to allow sufficient time for control system 10 to settle and to sample the various above-described fault conditions. At the end of this 3-second period of $\overline{LR}$, i.e., when $\overline{LR}$ goes to logic 1, $\overline{DO}$ could go to logic 0 in response to this $\overline{LR}$ and then quickly to logic 1 should a fault condition continue to exist, i.e., one or more of the inputs 128 from latch 130 could be at logic 0. To avoid this quick switching of states of $\overline{DO}$, which has the potential disadvantage of also quickly switching in and out the 3-phase power supply via drives 40 and controller 28, $\overline{RIP}$ is produced for the additional 3 seconds to maintain $\overline{DO}$ at logic 1. During this additional 3-second period should any of the inputs 128 from latch 130 be or go to logic 0, then when $\overline{RIP}$ goes to logic 1, $\overline{DO}$ will not switch states, i.e., it will remain at logic 1. If no fault condition exists, $\overline{DO}$ is allowed to go to logic 0.

With reference again to FIG. 5, a security circuit 324 is shown and is used to protect the computer system 12 against unauthorized access. Circuit 324 includes a normally closed switch 326 which, when closed, produces a logic 0 on a line 328 and, when open, produces a logic 1 on line 328. Switch 326 can be, for example, a key switch. A timer 330, a timer 332 and a counter 334 are disabled by the logic 0 and enabled by the logic 1 on line 328.

A signal emitter and detector circuit 336 has an output coupled over a line 338 as one input to an AND gate 340. Circuit 336 can be, for example, an ultrasonic emitter and detector or photoemitter and detector, or any other intrusion detection device, which outputs on line 338 a logic 0 when the emitted ultrasonic beam or light beam is broken and, therefore, not detected. The other input to gate 340 is on a line 341 which is coupled to the output of an AND gate 342 having one input connected to a line 344. Timer 330 has a (−) trigger input coupled to the output of gate 340 over a line 346 and an output $\overline{Q}$ coupled over a line 348 to an inverter 350. Timer 330 has, for example, a 200 msec. delay time out, so that the output $\overline{Q}$ on line 348 goes to logic 1 after timer 330 has timed out when it is no longer being triggered by the signals on line 346. This delay prevents false alarms of the security circuit 324 and ensures detection of a true unauthorized access condition, as will become apparent.

Timer 332 has a trigger input connected to the output of inverter 350 over a line 352. The time constant of timer 332 can be set and adjusted at installation by a dip switch 354, as will be further described. Timer 332, in response to being triggered by the signal on line 352, produces a logic 1 pulse on an output line 356 having a duration set by dip switch 354. An inverter 358 inverts the pulse on line 356 onto the line 344.

Counter 334 has a clock input connected to the line 344. At a predetermined count, as will be further described, counter 334 produces a logic 0 on an output line 360. An inverter 362 inverts the logic 0 on line 360 to a logic 1 on a line 364 and an inverter 366 inverts this logic 1 to a logic 0 on a line 368 which carries a security alarm signal $\overline{SEC.ALARM}$.

A normally open switch 370, which can be closed on installation, couples the line 368 to the line 264 (see FIG. 3) carrying $\overline{DPO}$. $\overline{SEC.ALARM}$ is used to enable an alarm and, as previously mentioned, $\overline{DPO}$ is used to produce the logic 1 $\overline{DO}$ to drive off the 3-phase power supply to the computer system 12 when an unauthorized access occurs.

An astable multivibrator or timer 372 having, for example, a 1-second time constant, is enabled by the output of an OR gate 374 over a line 376. One input to gate 374 is coupled to line 356 and the other input to line 364. Timer 372 provides its 1-second pulses over a line 378 as one input to an AND gate 380, whose other input is coupled over a line 382 to the output of a NAND gate 384. A line 386 carrying the 60 Hz clock is coupled to one input of gate 384, with the other input being coupled to the line 364. Gate 380 produces an output on a line 388 leading to an inverter 390 which is connected to the set input of a flip-flop 390 and to one input of a NAND gate 394 over a line 396. Flip-flop 392 has a reset input coupled to line 328 and an output Q coupled over a line 398 leading to the other input of gate 394. A red-green LED drive circuit 400 is driven by the output of gate 394 on a line 402 to drive a red-green LED 404.

Note that line 386 carrying the 60 Hz clock is provided as an input to gate 342. If it is assumed that gate 342 and gate 340 are otherwise enabled, the 60 Hz clock pulses are coupled through to line 346 to continually trigger timer 330.

In operation with switch 326 being closed, line 328 is at logic 0 and flip-flop 392 is reset, whereby line 398 is at logic 0 and gate 394 outputs a logic 1. Drive circuit 400 responds by driving LED 404 green, indicating that circuit 324 is not armed for protection purposes. Switch 326 is then opened to begin the procedure for arming the circuit 324. The resulting logic 1 on line 328 enables timer 330 and timer 332, as well as counter 334. Next, for reasons of testing the circuit 324 before it can be armed, as will be described below, the above-mentioned ultrasonic or light beam of circuit 336 must be broken, whereby line 338 goes to logic 0. Gate 340 is thus disabled and outputs a logic 0 on line 346 to disable the triggers to timer 330. The output on line 348 then goes high after 200 msec. and is inverted by inverter 350 to trigger timer 332 via line 352.

Timer 332 then produces a logic 1 on line for a predetermined period of time depending on the type of installation of circuit 324, as will be further described, such as 15 seconds. The logic 1 on line 356 then enables timer 372 via gate 374 to produce the 1-second timing pulses on line 378. At this time, line 360 from counter 334 is at logic 1 and inverted by inverter 362 to logic 0 on line 364. Therefore, gate 384 outputs a logic 1 on line 382 which enables gate 380 whose output on line 388 oscillates at the 1-second time period provided by timer 372, as then does the output on line 396 via inverter 390. Flip-flop 392 then is set by the first logic 0 on line 396 to produce a logic 1 on line 398 as an enabling input to gate 394. Then, line 402 oscillates between logic 1 and logic 0 each second in response to the 1-second oscillating pulses on line 396 to cause drive circuit 400 to drive LED 404 between red and green each second for the 15-second duration of the signal on line 356. This red-green oscillation indicates that the circuit 324 is in an arming mode (not yet armed). During this 15-second duration, line 344 is at logic 0 via inverter 358 to disable gate 342 and, thereby, inhibit or lock out any further triggering of timer 330 during this period.

Then, at the end of this 15-second period, timer 332 times out to produce a logic 0 on line 356. This logic 0 disables timer 372 via gate 374 and is inverted by inverter 358 onto line 344 to clock counter 334 to a count of 1 and to provide a logic 1 at gate 342. With timer 372 being disabled, line 378 goes to logic 0 and line 396 via disabled gate 380 and inverter 390 goes to logic 1 and stays at logic 1, with flip-flop 392 remaining set. Therefore, gate 394 outputs a logic 0, causing drive circuit 400 to drive LED 404 red, representing an armed condition for circuit 324.

Thereafter, if the ultrasonic or light beam is broken after circuit 324 is armed, circuit 336 again outputs a logic 0 on line 338 to disable gate 340 and timer 330, whereby timer 332 again is triggered. After timer 332 times out, i.e., after a delay provided by the timing constant of timer 332, line 344 goes to logic 1 via inverter 358 to clock counter 334 to a count of 2. Now, line 360 goes to logic 0 and is inverted by inverter 362 to a logic 1 on line 364. Consequently, timer 372 is enabled again via OR gate 374 to produce the 1-second pulses on line 378 and gate 384 is enabled to couple the 60 Hz clock from line 386 to line 382. Therefore, each 1-second interval that gate 380 is enabled, the 60 Hz clock is coupled onto line 388 and, via inverter 390, to gate 394 and line 402. Thus, during the 1-second interval of timer 372, drive circuit 400 drives LED 404 to oscillate at 60 Hz resulting in a yellow light emission, while during the interval that timer 372 is off to disable gate 380, line 402 is at logic 0 so that circuit 400 drives LED 404 is red. Consequently, LED 404 switches between yellow and red, thereby indicating an unauthorized access condition.

Moreover, with line 364 at logic 1, line 368 is at logic 0 via inverter 366 to generate $\overline{SEC.\ ALARM}$ and, via switch 370, $\overline{DPO}$. The former, i.e., $\overline{SEC.ALARM}$ at logic 0, activates an audible and visible alarm (not shown) at remote status module 54 (see FIG. 1). $\overline{DPO}$, being at logic 0, is coupled to circuit 124 shown in FIG. 3, to become latched in latch 130 and outputted as a logic 0 input 128 to gate 126 on the line 266. Therefore, $\overline{DO}$ goes to logic 1 to turn off the 3-phase power supply to computer system 12.

With reference again to FIG. 5, circuit 324 also has a timer 406 having, for example, a 15-second time constant settable with a dip switch 408. Timer 406 has a triggering input coupled to the output line 360 of counter 334. When the counter 334 counts to 2, line 360 goes to logic 0 to trigger timer 406. After its 15-second time period, timer 406 goes to logic 0 on a line 410 to produce $\overline{MAX.ALARM}$. In response to $\overline{MAX.ALARM}$, the audible and visible alarm (not shown) at remote status module 54 is energized to a higher frequency audible signal to maximize the warning signal.

As also shown, timer 406 also is coupled through switch 408 to the output of an inverter 412 over a line 414. The input to inverter 412 is line 248 which is coupled to the output of gate 238. As previously described, when a water/humidity or smoke/particulate fault condition occurs, gate 238 is disabled, so that a logic 0 is produced on line 248. This is inverted by inverter 412 and coupled through switch 408 to timer 406. Thus, 15 seconds after the onset of either of these fault conditions, MAX.ALARM is also generated to provide the high frequency alarm.

To disarm the circuit 324, the switch 326 is returned to its normally closed position. This resets flip-flop 392, producing the logic 0 on line 398. Thus, LED 404 is driven green via gate 394 and drive circuit 400, thereby indicating circuit 324 is disarmed. Also, timer 330, timer 332 and counter 334 are disabled via the logic 0 on line 328.

As described above, the generation of the logic 0 $\overline{DPO}$ is delayed until timer 332 times out after being triggered after circuit 324 has been armed. If this triggering occurs due to an authorized access, i.e., due to an authorized person breaking the ultrasonic or light beam, that person can disarm circuit 324 before such a $\overline{DPO}$ is generated by opening the switch 326 with the appropriate key.

Security circuit 324 also has an optional line 415 carrying a software intrusion signal $\overline{SOFT\ I}$ as an input to gate 342. $\overline{SOFT\ I}$ is produced by computer 14 and is used to prevent unauthorized use of the computer system 12. For example, should an unauthorized user fail to input to computer 14 a proper user identifying code, then a logic 0 $\overline{SOFT\ I}$ is produced to disable gate 342 and, therefore, gate 340 and timer 330. If it is assumed that security circuit 324 has been armed, as described above, then in a similar manner as described above, a logic 0 $\overline{DPO}$, $\overline{SEC.ALARM}$ and $\overline{MAX.ALARM}$ will be produced, and LED 404 will flash yellow-red, to warn of this intrusion. If there is no such intrusion, $\overline{SOFT\ I}$ is at logic 1 to enable gate 342.

FIG. 7 is a top view of a computer room 416 used to explain three types of installation of the computer protection system 10 for protection against unized access. The computer room 416 has an office area 418 with furniture 420 and two entrance and exit doors 422, 424. Computer room 416 also has a main computer room 426, with entrance and exit glass doors 428, 430, and a tape storage room 432 with an entrance and exit door 434. The computer 14 and peripherals 16 are in the main computer room 426 and a computer terminal 436 is on a work desk 438 in the office area 418.

The system control unit 26 of computer protection system 10 is installed in the office area 418 near work desk 438, while the power control unit 24 is installed in the main computer room 426. One specific type of installation has the emitter-detector circuit 336 of security protection circuit 324 located at one side of the office area 418 to protect only the tape storage area 432 and main computer room 426. Circuit 336 can be, as previously indicated, an ultrasonic transceiver 440 which emits an ultrasonic beam 442 across doors 428, 430, 434 and receives and detects the ultrasonic beam reflected from the other side of office area 418.

The circuit 324 having installation #1 is armed and disarmed in the following manner. An authorized operator of computer system 12 will arm the circuit 324 by first inserting a key to open the normally closed key switch 326 which is on the control unit 26. Then, the operator will walk to the beam 442 and break it once to put circuit 326 in the arming mode. At this time, the LED 404, which also is on control unit 26, will switch from green to flashing red and green for the time constant of timer 332, for example, for 5 seconds for this particular installation. After this 5-second period, the LED 404 switches to red, indicating that circuit 324 is armed. Thereafter, should an unauthorized access to main computer room 426 or tape storage room 432 be attempted, the beam 442 again will be broken. Circuit 324 then will cause a logic 0 $\overline{DPO}$, $\overline{SEC.ALARM}$ and, ultimately, $\overline{MAX.\ ALARM}$ to be generated, as well as LED 404 to flash yellow-red, as previously described. Circuit 324 then can be disarmed by opening key switch 326 with the key. Furthermore, a similar LED 404 and appropriate circuit connection could be made at the Remote Status Module 54 (see FIG. 1) to indicate the armed/disarmed condition of circuit 324.

FIG. 7 also shows an installation #2 for the ultrasonic transceiver 440 as an alternative to installation #1. In addition to protecting the main computer room 426 and tape storage area 432, this installation #2 also protects the office area 418. The ultrasonic beam 442 is projected across doors 422, 424, which are the only entrance and exit passages to the overall computer room 416. In this installation #2, the arming of circuit 324 occurs in a similar manner as installation #1, except timer 332 is given a timing constant of 15 seconds for the following reason. After using the key to open the key switch 326 at control unit 26, the operator will break the beam 442 by exiting the office area 418 through one of the doors 422, 424. During the 15-second timing constant of timer 332, the LED 404 will flash red-green. After this 15-second period, and being out of the office area 418, the operator can look through an appropriate glass panel to see if the LED 404 on control unit 26 is red, thereby verifying that the circuit 324 is armed. Thereafter, should the beam 442 again be broken by an unauthorized access, circuit 324 will function as previously described to drive off the computer system 12 and provide the various warning signals. However, if the beam 442 were so broken due to an authorized access by the operator, circuit 324 again can be disarmed by opening switch 326 with the operator key. The 15-second period provides time for the operator to walk to the control panel 26 and disarm the circuit 324 by closing the switch 326 before the logic 0 $\overline{DPO}$, or $\overline{SEC.ALARM}$ is generated. Also, a remote indication of the armed/disarmed condition of circuit 324 for installation #2 can be given at the Remote Status Module 54, as mentioned above.

A third type of installation, as indicated in FIG. 7, is similar to installation #2, except circuit 324 is armed/disarmed outside the office area 418 at an arming module 444 which has the key switch 326. After leaving the office area 418, the operator inserts the key in arming module 444 to open the switch 326 and then breaks the beam 442. After, for example, 5 seconds, which can be the timing constant for timer 332 for installation #3, the circuit 324 is armed. The LED 404 also is at the arming module 444 to indicate the armed/disarmed status of circuit 324. Also, a similar LED 404 and appropriate circuit connection can be made at Remote Status Module 54 to indicate the armed/disarmed status of circuit 324 for installation #3.

One reason for having the arming mode of circuit 324, in which the beam 442 must be broken after switch 326 is opened, is to test the circuit 324 and, in particular, the emitter-detector circuit 440 to make sure it is operational and has not been tampered with. For example, it might otherwise be possible to gain unauthorized access to the computer system 12 by modifying or tampering with the emitter-detector circuit 440, such as by an appropriate short-circuit connection, so that circuit 440 always appears to be detecting the beam 442 even when the beam is broken. By requiring that the beam 442 be broken once before circuit 324 is armed, the operator will know that the emitter-detector circuit 440 or any other component of circuit 324 is operational.

In connection with FIG. 6 again, a circuit 446 is used to display on control unit 26 various data relating to the fault conditions. Circuit 446 generates a display temperature control signal $\overline{DIS.TEMP}$ on an output line 448 and a clock halt control signal $\overline{CLK.HALT}$ on an output line 450. When $\overline{DIS.TEMP}$ is at logic 1, real time will be shown on control unit 26, whereas when $\overline{DIS.TEMP}$ is at logic 0 control unit 26 will display temperature. When $\overline{CLK.HALT}$ is at logic 1, real time will continue to be displayed, whereas when $\overline{CLK.HALT}$ is at logic 0, the time at which a fault condition has occurred will be displayed.

Circuit 446 has an input line 452 carrying a select temperature signal $\overline{SEL.TEMP}$ as one input to a NOR gate 454. The other input to gate 454 is the output of an astable multivibrator 456 over a line 458. A NAND gate 460 has one input connected to the output of gate 454 over a line 462 and another input connected to the output of a flip-flop 464 over a line 466. Gate 460 provides an output on a line 468 as one input to a NAND gate 470, whose output on a line 472 is inverted by inverter 474 onto the line 448. As will be described, when $\overline{SEL.TEMP}$ is at logic 1, real time is displayed, whereas when $\overline{SEL.TEMP}$ is at logic 0, real time and temperature are displayed alternately at the pulsing period of multivibrator 456.

Gate 470 has another input connected to a line 476 which is the output of a NAND gate 478. One input to gate 478 is the line 466 and the other input is connected to the output of an inverter 480 over a line 482, with the input to inverter 480 being the line 230 carrying $\overline{TAL}$ (see FIG. 4).

To produce $\overline{CLK.HALT}$, an AND gate 484 has one input connected to line 36 carrying $\overline{DO}$ and another input connected to the output of an inverter 486 over a line 488. Inverter 486 has its input coupled over a line 490 to the output of a timer 492 which is triggered over an input line 494 by the output of a NAND gate 496. Line 36 carrying $\overline{DO}$ and line 312 carrying $\overline{OR}$ are the two inputs to gate 496. Timer 492 also has an enabling input coupled to line 36.

Flip-flop 464 has a reset input connected to the output of inverter 280 on line 282 and a reset input connected to the output of a NOR gate 498 over a line 500. One input to gate 458 is the output of timer 314 on line 318 and the other input is the output of an inverter 502 on a line 504, whose input is the line 308. AND gate 484 provides its output on a line 506, which is inverted by an inverter 508 onto line 450.

In the operation of circuit 446, assume that flip-flop 464 is reset to produce a logic 1 on line 466. This reset is produced as a result of line 282 going to logic 0 at power-up, as previously described, or as a result of $\overline{OR}$ going to logic 0 when the operator reset button is depressed. When $\overline{OR}$ goes to logic 0, input line 318 or input line 504 to gate 498 goes to logic 1, so that line 500 goes to logic 0.

Assume now also that the display of real time has been selected, i.e., $\overline{SEL.TEMP}$ is a logic 1. Therefore, line 452 is a logic 1, so that line 462 via gate 454 is at logic 0. Thus, with line 466 being at logic 1, gate 460 outputs a logic 1 on line 468 as an input to gate 470. If it also is assumed that $\overline{TAL}$ is at logic 1, i.e., the temperature-at-limit condition has not been reached, then line 230 is at logic 1 and line 482 via inverter 480 is at logic 0. Therefore, gate 478 outputs on line 476 a logic 1, whereby gate 470 outputs a logic 0 on line 472 that is inverted by inverter 474 onto line 448. Thus, $\overline{DIS.TEMP}$ is at logic 1 to display real time.

If, however, $\overline{SEL.TEMP}$ is at logic 0 to alternately display time and temperature at the pulsing period of multivibrator 456, then line 452 is at logic 0. Gate 454 then gates the pulses on line 458 from multivibrator 454 onto line 462 and these pulses are coupled by gate 460 onto line 468 and then by gate 470 onto line 472. Therefore, the output of inverter 474, i.e., $\overline{DIS.TEMP}$, alternates between logic 1 and logic 0 in accordance with the period of multivibrator 456 to alternate the display of real time and temperature.

Whenever a temperature-at-limit condition occurs, $\overline{TAL}$ goes to logic 0, resulting in inverter 480 outputting a logic 1 on line 482. Consequently, gate 478 now outputs a logic 0 on line 476 which disables gate 470 to output a logic 1 on line 472. $\overline{DIS.TEMP}$ now goes to logic 0 via inverter display the temperature at this limit condition.

Until a fault condition occurs, gate 484 is disabled, so that the logic 0 on line 506 is inverted by inverter 508 to a logic 1 $\overline{CLK.HALT}$ and the real time data can continue. When a fault condition occurs, $\overline{DO}$ on line 36 goes to logic 1 as one input to gate 496. The other input $\overline{OR}$ on line 312 is at logic 1. Therefore, gate 496 is enabled to produce a logic 1 on line 494 to trigger timer 492 at this time. Thus, line 490 from timer 492 goes to logic 0, which is inverted by inverter 486 to a logic 1 on line 488. With $\overline{DO}$ being at logic 1, gate 484 is enabled to output a logic 0 on line 506 that is inverted by inverter 508 as a logic 0 $\overline{CLK.HALT}$ on line 450 to stop the real time data at the time a fault occurred.

Also, the logic 0 on line 490 sets flip-flop 464 to produce a logic 0 on line 466. Therefore, gate 460 and gate 478 each output a logic 1 on line 468 and line 476, so that $\overline{DIS.TEMP}$ goes to logic 1 via gate 470 and inverter 474 to display the time at which the fault occurred.

Also shown in FIG. 6 is a retriggerable timer 510 which is retriggered by the 60 Hz clock on a line 512. An AND gate 514 has one input connected to the output of timer 510 over a line 516 and an output coupled to the clock input of a flip-flop 518 over a line 520. The output Q of flip-flop 518 is fed back over a line 522 as the other input to gate 514, and the output $\overline{Q}$ is coupled over a line 524 to an inverter 526 whose output is connected to line 274 carrying $\overline{POWF}$. Flip-flop 518 is preset via the signal on line 504 to provide output Q at logic 1 and hence to enable gate 514.

In operation, as long as the 60 Hz clock exists on line 512, i.e., as long as there is no power failure, timer 510 is continually triggered to output a logic 1 on line 516 and enable gate 514. Should a short power failure of, for example, 125 msec., occur, the 60 Hz clock will cease, causing timer 510 to time out and disable gate 514. The resulting logic 0 on line 520 clocks flip-flop 518 to produce a logic 1 output $\overline{Q}$ on line 524, which is inverted by inverter 526 to a logic 0 $\overline{POWF}$ on line 274. This circuit is incorporated to indicate on control unit 26 a short term power failure that may or may not be of sufficient duration so as to cause the dropout of a main computer mechanical circuit breaker contactor (not shown). Flip-flop 518 is again reset after the operator reset button is depressed and a logic 1 $\overline{OR}$ appears on line 312.

With reference again to FIG. 4, to generate an audio alarm at control unit 26 when a fault condition occurs, a NAND gate 528 has one input coupled to the output line 230 carrying $\overline{TAL}$ and another input connected to the line 410 (see FIG. 5) carrying $\overline{MAX.ALARM}$. An OR gate 530 has one input connected over a line 532 to the output of gate 528. An OR gate 534 has one input coupled to the output of gate 530 over a line 536 and an output coupled over a line 538 as an input to an AND gate 540. The other input to gate 540 is the output Q of a flip-flop 542 over a line 544, whose reset input is coupled to a line 546 carrying $\overline{OR}$ and whose set input is connected to line 538. Gate 540 produces a system alarm signal SYS.ALARM on a line 548 to enable an oscillator 550 which drives an audio amplifier 552 over a line 554.

An AND gate 556 has one input carrying $\overline{SALARM}$ on line 246 and $\overline{WALARM}$ on line 242 (see FIG. 5). A NAND gate 558 has one input coupled to the output of gate 556 over a line 560 and another input coupled to line 264 carrying $\overline{DPO}$ (see FIG. 5). The output of gate 558 is provided on a line 562 which is the other input to gate 530.

A solid state switch 564 controls the energization of the oscillator 550 over a line 566 and is controlled by $\overline{DO}$ on line 36 as well as the signals on line 532 and line 562.

In operation, assume an operator reset has been initiated, so that $\overline{OR}$ is at logic 0 to reset flip-flop 542 which then produces a logic 0 on line 544 to disable gate 540. Hence, SYS.ALARM on line 548 goes to logic 0 to disable oscillator 550. Now assume that a fault condition has occurred, whereby $\overline{SALARM}$ or $\overline{WALARM}$ or $\overline{DPO}$ has been produced. With $\overline{SALARM}$ or $\overline{WALARM}$ at logic 0, gate 556 is disabled, resulting in line 560 going to logic 0 and line 562 via gate 558 to logic 1. If $\overline{DPO}$ goes to logic 0, line 562 also goes to logic 1 via gate 558.

Gate 530 couples the logic 1 on line 562 onto line 536 and through gate 534 to line 538. Consequently, flip-flop 542 is set to produce a logic 1 on line 544. Gate 540 is now enabled via the logic 1 on line 538 and line 544 to produce a logic 1 SYS.ALARM which enables oscillator 550. Also at this time, $\overline{DO}$ on line 36 is at logic 0. Thus, switch 564 responds to the logic 0 on line 36 and logic 1 on line 562 by controlling oscillator 550 to produce a low frequency modulated signal on line 554 that drives audio amplifier 552.

Whenever $\overline{MAX.ALARM}$ on line 410 or $\overline{TAL}$ on line 230 go to logic 0, gate 528 outputs a logic 1 on line 532 which is inputted to switch 564 and which is coupled through gate 530 and gate 534 onto line 538. If flip-flop 542 has not been previously set, it is set by this logic 1 on line 538, resulting in oscillator 550 being enabled by SYS.ALARM on line 548 from gate 540. Also, if a fault condition causes the discontinuance of power to the computer 14, switch 564 now responds to the input logic 1 signal on line 36 by controlling oscillator 550 to output a non-modulated signal which drives audio amplifier 552.

When a test of the alarm system is required, the operator initiated system test signal $\overline{ST}$ at logic 0 is produced on line 229. This results in gate 228 being disabled to output $\overline{TAL}$ with the same results as just described above.

A front panel 568 for control unit 26 is shown in FIG. 8. Panel 568 has a plurality of LED's 570 to indicate the status of system 10. Thus, when power button 572 on panel 568 is depressed, the COMPUTER POWER ON LED 570 is energized after the three-minute power-up delay plus the 6-second $\overline{RIP}$ delay after the initiation of the operator reset. When $\overline{RIP}$ on line 270 is produced (see FIG. 6), the RESET IN PROGRESS LED 570 is energized. When, as shown in FIG. 3, latch 130 latches $\overline{OTL}$, $\overline{WMAXL}$, $\overline{SMAXL}$, $\overline{LVHL}$, $\overline{LVLL}$, $\overline{PFL}$ or $\overline{MPIL}$, then the corresponding LED 570 on panel 568 is energized. And, when $\overline{POWF}$ (see FIG. 6) is produced on line 274, then the POWER FAILURE LED 570 is energized. Also, LED 404 (see FIG. 5) is on front panel 568 to indicate the status of security circuit 324.

Front panel 568 also has a digital display module (DDM) 574 to display time and/or temperature as previously described. Front panel 568 also has a display button 576 to produce either the logic 1 or 0 $\overline{SEL.-TEMP}$ described above in connection with circuit 446 of FIG. 6, as well as a system reset button 578 which can be depressed to generate $\overline{OR}$ for an operator initiated reset and a system test button 580 to produce $\overline{ST}$ which was discussed above in relation to FIG. 4. Front panel 568 furthermore has a conventional fast set button 582 and slow set button 584 to set the proper real time for display on display 574.

In the overall operation of control system 10, as one example, assume that the system 10 has been installed in a computer room 416, e.g., installation #1, that the power has been turned on by depressing power button 572, and that display button 576 has been depressed to select the alternate display of time-temperature. Also assume that the system reset button 578 has been depressed, so that the control system 10 has been reset and that no fault conditions of any kind are occurring.

Also, assume that the control system 10 is disarmed, i.e., key switch 326 is closed and LED 404 is energized green.

Assume now that either a power supply fault condition or an environmental fault condition has occurred for any minimum period, as previously described. Latch 130 shown in FIG. 3 will latch the appropriate signal and provide it as an input 128 to gate 126, whereby a logic 1 $\overline{DO}$ is produced on line 36. The result is that $\overline{GD}$ shown in FIG. 2 goes to logic 1 to cause the gate drivers 40 to drive off solid state controller 28, so that the supply of 3-phase power to computer system 12 is discontinued. Furthermore, the particular signal latched in latch 130 is coupled to energize the corresponding LED 570 on front panel 568 to indicate for the operator the particular fault condition causing the discontinuance of the 3-phase power supply. Still furthermore, the logic 1 $\overline{DO}$ also causes the generation of the logic 0 $\overline{CLK.HALT}$ shown in FIG. 6, whereby the time at which the fault occurred will be displayed since the real time clock (not shown) is halted at this time. By latching the particular signal in latch 130 and energizing the appropriate LED 570, an operator will know which fault condition occurred, even should the fault condition then disappear.

After the fault condition has ceased, the operator will reset the real time display using the fast set and slow set buttons shown in FIG. 9 and then depress system reset button 578. This will reset latch 130 via $\overline{OR}$ in anticipation of protecting the computer system 12 against the power supply or environmental fault conditions should they occur again. At the end of the day, the operator will arm the security system by opening the key switch 326 and breaking the ultrasonic or light beam once to make sure the security system is operational. Thereafter, should the beam again be broken due to an unauthorized access, $\overline{DPO}$ will be produced and latched in latch 130, whereby the logic 1 $\overline{DO}$ is outputted to discontinue the 3-phase power supply.

Also, whenever any fault condition occurs, the various audio and visual alarms previously described will be produced.

Other aspects, objects and advantages of the present invention will be apparent from a study of the drawings and the appended claims.

I claim:

1. A system for protecting a computer being supplied with three-phase power, comprising:
   (a) means for monitoring and reacting to a power supply fault condition, including
      (i) means for detecting loss of power or phase rotation of the three-phase power; and
      (ii) means for generating a phase fault control signal in response to the power loss or phase rotation;
   (b) means for monitoring and reacting to an overtemperature fault condition, including
      (i) means for detecting the temperature at the computer; and
      (ii) means for generating a reset control signal at power-up of the computer independent of the temperature at the computer;
   (c) means for monitoring and reacting to an unauthorized access fault condition, including
      (i) means for producing a delayed power off control signal in response to the unauthorized access;
      (ii) means for arming said producing means; and
      (iii) means for testing said arming and producing means prior to each arming to ensure the operativeness of said arming and producing means; and
   (d) means for driving off the supply of power to the computer in response to the phase fault control signal, the reset control signal and the delayed power off control signal.

2. A system according to claim 1 wherein said means for detecting loss of power or phase rotation comprises:
   (a) means for producing initially a first triggering signal in response to power-up of the computer;
   (b) means for sensing the three-phase power and for generating a first signal, a second signal and a third signal representing, respectively, a phase of the three-phase power;
   (c) means for producing a data signal in response to the second signal and the third signal;
   (d) means, having a data input receiving the data signal and a clock input receiving the first signal, for producing an enabling signal;
   (e) means for producing periodically second triggering signals in response to the enabling signal; and
   (f) triggerable means for producing a timing signal in response to the first triggering signal or the second triggering signals, the phase fault control signal being generated to supply the three-phase power to the computer in response to the presence of the first triggerable signal or the second triggerable signals and to discontinue the supply of the three-phase power in response to the absence of the first triggering signal and the second triggering signals.

3. A system, according to claim 1, wherein said means for testing comprises;
   (a) means, connected to said arming and producing means, for generating an arming control signal in response to the breaking of the detection beam; and
   (b) means for indicating the first detection in response to the arming control signal.

4. A system, according to claim 1, wherein said means for detecting the temperature at the computer comprises:
   (a) means for generating an overtemperature control signal in response to an overtemperature condition; and
   (b) resettable means for storing the overtemperature control signal.

5. A system, according to claim 4, wherein said means for generating a reset control signal comprises:
   (a) means for producing the reset control signal for at least a predetermined time, said resettable storing means being reset in response to the reset control signal; and
   (b) said driving off means driving off the supply of power to the computer in response to the reset control signal independent of the overtemperature control signal during the predetermined time and in response to the overtemperature control signal after the predetermined time.

6. A system, according to claim 1, wherein said means for testing comprises means for producing a detection beam which is broken to test said arming and producing means.

7. A system, according to claim 1, wherein said producing means, said arming means and said testing means comprise, in common, means for indicating an unarmed condition, an arming condition, an armed condition and an unauthorized access condition.

8. A system, according to claim 1, wherein said means for monitoring and reacting to an unauthorized access fault condition further monitors and reacts to unauthorized use of the computer.

9. A control circuit controlling the supply of power to a computer system, comprising:
   (a) means for sensing the temperature at the computer system and for generating an overtemperature signal in response to an overtemperature condition;
   (b) resettable latch means for storing the overtemperature signal;
   (c) first means for generating a latch reset signal for at least a first predetermined time at power-up of the computer system, said resettable latch means being reset in response to the latch reset signal;
   (d) means for generating a drives-off control signal to drive off the supply of power to the computer system in response to the latch reset signal independent of the absence or presence of overtemperature signal and to drive off the supply of power to the computer system in response to the overtemperature signal after expiration of the first predetermined time;
   (e) operator control means for producing an operator reset signal;

(f) means for controlling said first latch reset signal generating means to discontinue the generation of the latch reset signal after the first predetermined time in response to the operator reset signal; and (g) second means for generating the latch reset signal for a second predetermined time in response to the operator reset signal.

10. A control circuit according to claim 9 further comprising means for generating a reset-in-progress signal for a third predetermined time in response to the operator reset signal, said drives-off control signal generating means being responsive to the reset-in-progress signal to drive off the supply of power to the computer system.

11. A control circuit according to claim 10 wherein the first predetermined time is longer than the second predetermined time and the duration of the third predetermined time is between the first predetermined time and the second predetermined time.

12. A control circuit according to claim 9, further comprising:

(a) means for sensing water at the computer system and for generating a water maximum signal in response to a maximum allowable water condition; and (b) means for sensing smoke and for generating a smoke maximum signal in response to a maximum allowable smoke condition, said resettable latch means for storing the water maximum signal and the smoke maximum signal and said drives-off control signal generating means generating the drives-off control signal in response to the stored water maximum signal or smoke maximum signal.

13. Apparatus for providing information about a condition of a device, comprising:

(a) a display;

(b) means for sensing the temperature at the device;

(c) means for producing real time data;

(d) means for selecting to display on said display either the real time or alternately the real time and temperature; and (e) means for generating a clock halt control signal to halt the real time data at the time of a fault condition of the device.

14. Apparatus, according to claim 13, further comprising:

(a) means, connected to said temperature sensing means, for generating a temperature-at-limit control signal; and (b) means for overriding said selecting means to display the temperature at the device in response to the temperature-at-limit control signal.

15. A system for protecting a computer being supplied with three-phase power, comprising:

(a) means for monitoring and reacting to a power supply fault condition, including (i) means for detecting loss of power or phase rotation of the three-phase power including means for producing initially a first triggering signal in response to power-up of the computer, means for sensing the three-phase power and for generating a first signal, a second signal and a third signal representing, respectively, a phase of the three-phase power, means for producing a data signal in response to the second signal and the third signal, means, having a data input receiving the data signal and a clock input receiving the first signal, for producing an enabling signal, means for producing periodically second triggering signals in response to the enabling signal, and triggerable means for producing a timing signal in response to the first triggering signal or the second triggering signals; and (ii) means for generating a phase fault control signal in response to the absence of said timing signal;

(b) means for monitoring and reacting to an overtemperature fault condition, including (i) means for detecting the temperature at the computer; and (ii) means for generating a reset control signal at power-up of the computer independent of the temperature at the computer;

(c) means for monitoring and reacting to an unauthorized access fault condition, including (i) means for producing a delayed power off control signal in response to the unauthorized access;

(ii) means for arming said producing means; and (iii) means for testing said arming and producing means prior to each arming to ensure the operativeness of said arming and producing means; and (d) means for driving off the supply of power to the computer in response to the phase fault control signal, the reset control signal and the delayed power off control signal.

16. A system, according to claim 15, wherein said means for detecting the temperature at the computer comprises:

(a) means for generating an overtemperature control signal in response to an overtemperature condition; and (b) resettable means for storing the overtemperature control signal.

17. A system, according to claim 16, wherein said means for generating a reset control signal comprises:

(a) means for producing the reset control signal for at least a predetermined time, said resettable storing means being reset in response to the reset control signal; and (b) said driving off means driving off the supply of power to the computer in response to the reset control signal independent of the overtemperature control signal during the predetermined time and in response to the overtemperature control signal during the predetermined time and in response to the overtemperature control signal after the predetermined time.

18. A system, according to claim 15, wherein said means for testing comprises means for producing a detection beam which is broken to test said arming and producing means.

19. A system, according to claim 18, wherein said means for testing comprises:

(a) means, connected to said arming and producing means, for generating an arming control signal in response to the breaking of the detection beam; and (b) means for indicating the first detection in response to the arming control signal.

20. A system, according to claim 15, wherein said producing means, said arming means and said testing means comprise, in common, means for indicating an unarmed condition, an arming condition, an armed condition and an unauthorized access condition.

21. A system, according to claim 15, wherein said means for monitoring and reacting to an unauthorized access fault condition further monitors and reacts to unauthorized use of the computer.

* * * * *